(12) United States Patent
Sasade et al.

(10) Patent No.: US 11,273,845 B2
(45) Date of Patent: Mar. 15, 2022

(54) VEHICLE CONTROL APPARATUS

(71) Applicant: TOYOTA JIDOSHA KABUSHIKI KAISHA, Toyota (JP)

(72) Inventors: Shinichi Sasade, Toyota (JP); Kenta Kumazaki, Anjo (JP); Jun Goto, Toyota (JP); Koji Sugiyama, Toyota (JP); Takahiro Kimura, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 356 days.

(21) Appl. No.: 16/555,474

(22) Filed: Aug. 29, 2019

(65) Prior Publication Data

US 2020/0070852 A1 Mar. 5, 2020

(30) Foreign Application Priority Data

Aug. 29, 2018 (JP) .............................. JP2018-160784

(51) Int. Cl.
| | |
|---|---|
| *B60W 50/12* | (2012.01) |
| *B60W 10/11* | (2012.01) |
| *B60W 30/18* | (2012.01) |
| *F16H 59/14* | (2006.01) |
| *F16H 59/36* | (2006.01) |
| *F16H 61/682* | (2006.01) |

(52) U.S. Cl.
CPC ............ *B60W 50/12* (2013.01); *B60W 10/11* (2013.01); *B60W 30/18* (2013.01); *F16H 59/14* (2013.01); *F16H 59/36* (2013.01); *F16H 61/682* (2013.01)

(58) Field of Classification Search
CPC ...... B60W 50/12; B60W 10/11; B60W 30/18; F16H 59/14; F16H 59/36; F16H 61/682
See application file for complete search history.

(56) References Cited

U.S. PATENT DOCUMENTS

| | | | |
|---|---|---|---|
| 5,794,170 A * | 8/1998 | Kuroda ................... | F16H 61/21 701/93 |
| 2014/0080668 A1 * | 3/2014 | Doering .......... | B60W 30/18072 477/97 |

(Continued)

FOREIGN PATENT DOCUMENTS

| | | | | |
|---|---|---|---|---|
| JP | 3783547 B2 * | 6/2006 | ............. | F16H 61/04 |
| JP | 2009-166643 A | 7/2009 | | |

(Continued)

*Primary Examiner* — Tisha D Lewis
(74) *Attorney, Agent, or Firm* — Hunton Andrews Kurth LLP

(57) ABSTRACT

A control apparatus for a vehicle having a step-variable transmission. The control apparatus includes: a shift control portion to temporarily increase an input torque of the step-variable transmission beyond a required value, the shift control portion commanding an engaging-side coupling device which is the coupling device placed in a released state, to be brought into an engaged state, when the input speed has been raised to a predetermined value; and a torque increasing amount setting portion to set an amount of increase of the input torque of the step-variable transmission beyond the required value, such that the amount of increase is smaller when a rate of change of a running speed of the vehicle is relatively low than when the rate of change is relatively high, the rate of change of the running speed having a negative value in a decelerating state of the vehicle.

6 Claims, 7 Drawing Sheets

(56) References Cited

U.S. PATENT DOCUMENTS

| | | | |
|---|---|---|---|
| 2018/0148064 A1 | 5/2018 | Goto et al. | |
| 2018/0170166 A1 | 6/2018 | Sugiyama et al. | |
| 2018/0170390 A1 | 6/2018 | Tatsushiro et al. | |

FOREIGN PATENT DOCUMENTS

| | | | |
|---|---|---|---|
| JP | 2012046003 A | 3/2012 | |
| JP | 2012086763 A | 5/2012 | |
| JP | 2018086975 A | 6/2018 | |
| JP | 2018095166 A | 6/2018 | |
| JP | 2018100004 A | 6/2018 | |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2018-160784 filed on Aug. 29, 2018, the disclosure of which is incorporated herein by reference in its entirety.

FIELD OF THE INVENTION

The present invention relates to a control apparatus for a vehicle provided with a drive power source, drive wheels, and a step-variable transmission which constitutes a part of a power transmitting path between the drive power source and the drive wheels.

BACKGROUND OF THE INVENTION

There is well known a control apparatus for a vehicle provided with an engine, drive wheels, and a step-variable transmission which constitutes a part of a power transmitting path between the engine and the drive wheels and which has a plurality of coupling devices which are selectively engaged to establish a selected one of a plurality of gear or speed positions. For example, JP2009-166643A discloses a control apparatus for controlling this type of vehicular drive system. The control apparatus disclosed in the above-identified publication is configured such that an input torque of the step-variable transmission is temporarily increased in the process of a coasting shift-down action of the step-variable transmission to a first speed gear position, to raise an input speed of the step-variable transmission toward a synchronization value in the first speed gear position, and the coupling device to be engaged to establish the first speed gear position is brought into its fully engaged state with a rise of an engaging hydraulic pressure applied thereto, when the input speed has reached a predetermined target value.

By the way, a rate of change of the synchronization value of the input speed of the step-variable transmission in the gear position established after its coasting shift-down action varies depending upon a rate of change of the running speed of the vehicle. In a decelerating state of the vehicle, the rate of change of the vehicle running speed has a negative value. Where the rate of change of the vehicle running speed in a decelerating state of the vehicle is relatively low, that is, where a deceleration value of the vehicle is relatively high, a rate of decrease of the synchronization value of the input speed is relatively high than where the vehicle deceleration value is relatively low. Accordingly, if the input torque is increased by a predetermined constant amount irrespective of the rate of change of the vehicle running speed, to raise the input speed, it takes a relatively long time for the input speed to reach the synchronization value so that the time required for completion of the coasting shift-down action is relatively long, when the rate of change of the vehicle running speed is relatively high. Namely, there is a risk of a slow progress of the coasting shift-down action when the rate of change of the vehicle running speed is relatively high. When the rate of change of the vehicle running speed is relatively low, on the other hand, the input speed is excessively rapidly raised toward the synchronization value, so that there is a risk of increase of a synchronizing shock of the step-variable transmission.

SUMMARY OF THE INVENTION

The present invention was made in view of the background art described above. It is therefore an object of the present invention to provide a control apparatus for a vehicle provided with a step-variable automatic transmission, which control apparatus permits reduction of a synchronizing shock of the step-variable transmission in the process of its coasting shift-down action when a rate of change of the running speed of the vehicle is relatively low, while preventing a slow progress of the coasting shift-down action.

The object indicated above is achieved according to the following modes of the present invention:

According to a first mode of the invention, there is provided a control apparatus for a vehicle provided with a drive power source, drive wheels, and a step-variable transmission which constitutes a part of a power transmitting path between the drive power source and the drive wheels and which has a plurality of coupling devices which are selectively engaged to establish a selected one of a plurality of gear positions, the control apparatus comprising: a shift control portion configured to temporarily increase an input torque of the step-variable transmission beyond a required value, in the process of a coasting shift-down action of the step-variable transmission, to thereby raise an input speed of the step-variable transmission toward a synchronization value in the gear position to be established after the coasting shift-down action, the shift control portion commanding an engaging-side coupling device which is the coupling device placed in a released state before the coasting shift-down action, to be brought into an engaged state, when the input speed has been raised to a predetermined value; and a torque increasing amount setting portion configured to set an amount of increase of the input torque of the step-variable transmission beyond the required value in the process of the coasting shift-down action, such that the amount of increase is smaller when a rate of change of a running speed of the vehicle is relatively low than when the rate of change is relatively high, the rate of change of the running speed having a negative value in a decelerating state of the vehicle.

According to a second mode of the invention, the control apparatus according to the first mode of the invention is configured to control the coasting shift-down action of the step-variable transmission to the above-indicated selected one gear position, which is established by an engaging action of the engaging-side coupling device and established by an engaging action of a one-way clutch disposed parallel with the engaging-side coupling device.

According to a third mode of the invention, the control apparatus according to the first or second mode of the invention is configured such that the shift control portion reduces the temporarily increased input torque of the step-variable transmission when the input speed of the step-variable transmission has been raised to a second predetermined value lower than said predetermined value, in the process of the coasting shift-down action, and the torque increasing amount setting portion sets an upper limit of the input torque to or below which the input torque is reduced, such that the upper limit is smaller when the rate of change of the running speed is relatively low than when the rate of change is relatively high.

According to a fourth mode of the invention, the control apparatus according to any one of the first through third modes of the invention is configured such that the torque increasing amount setting portion sets the amount of increase of the input torque of the step-variable transmission such that the amount of increase decreases with a decrease of the running speed of the vehicle.

According to a fifth mode of the invention, the control apparatus according to any one of the first through fourth modes of the invention is configured to control the step-variable transmission wherein each of the plurality of coupling devices is a hydraulically operated coupling device. In the present control apparatus, the torque increasing amount setting portion sets the amount of increase of the input torque of the step-variable transmission such that the amount of increase increases with a decrease of a temperature of a working fluid used to operate the hydraulically operated coupling device.

According to a sixth mode of the invention, the control apparatus according to any one of the first through fifth modes of the invention is configured to control the vehicle which is a hybrid vehicle provided with: an engine functioning as the drive power source; an electrically controlled transmission mechanism having a differential mechanism operatively connected to the engine in a power transmittable manner, and a first motor/generator which is operatively connected to the differential mechanism in a power transmittable manner and an operating state of which is controlled to control a differential state of the differential mechanism; and a second motor/generator which is operatively connected to an output rotary member of the electrically controlled transmission mechanism in a power transmittable manner and which functions as the drive power source. In the present control apparatus, the shift control portion temporarily increases the input torque of the step-variable transmission beyond the required value thereof, by temporarily increasing an output torque of the second motor/generator beyond a required value thereof.

As described above, the control apparatus according to the first mode of the invention is configured to set the amount of increase of the input torque of the step-variable transmission beyond the required value in the process of its coasting shift-down action, such that the amount of increase is smaller when the rate of change of the running speed of the vehicle is relatively low than when the rate of change is relatively high. When the rate of change of the vehicle running speed is relatively high, for instance, when the acceleration value of the vehicle is relatively large, the synchronization value of the input speed of the step-variable transmission is accordingly raised, so that it takes a relatively long time for the input speed to be raised to the synchronization value. However, the control apparatus according to the present invention is configured to set a comparatively large amount of increase of the input torque, so that the input speed can be raised to the synchronization value in a relatively short length of time. When the rate of change of the vehicle running speed is relatively low, for instance, when the deceleration value of the vehicle is relatively large, the synchronization value of the input speed is accordingly lowered, so that the input speed is excessively rapidly raised to the synchronization value. However, the present control apparatus is configured to set a comparatively small amount of increase of the input torque, so that it is possible to reduce a risk of an excessively rapid rise of the input speed to the synchronization value. Thus, the present control apparatus permits reduction of a synchronizing shock of the step-variable transmission in the process of its coasting shift-down action when the rate of change of the running speed of the vehicle is relatively low, while preventing a slow progress of the coasting shift-down action.

The control apparatus according to the second mode of the invention is configured to control the coasting shift-down action of the step-variable transmission to the above-indicated selected one gear position, which is established by the engaging action of the engaging-side coupling device and established by the engaging action of the one-way clutch disposed parallel with the engaging-side coupling device. When the rate of change of the vehicle running speed is relatively low, for instance, when the deceleration value of the vehicle is relatively large, in the process of the coasting shift-down action to the above-indicated gear position, the step-variable transmission is generally likely to suffer from a synchronizing shock upon full engagement of the one-way clutch when the input speed of the step-variable transmission has been raised to the synchronization speed before full engagement of the engaging-side coupling device. In the control apparatus according to the present second mode of the invention, however, the amount of increase of the input torque of the step-variable transmission is set so as to be comparatively small. Accordingly, the present control apparatus reduces a risk of excessively rapid rise of the input speed toward the synchronization speed and a consequent risk of generation of the synchronizing shock.

The control apparatus according to the third mode of the invention is configured such that the input torque of the step-variable transmission which has been temporarily increased is reduced when the input speed of the step-variable transmission has been raised to the second predetermined value in the process of the coasting shift-down action. Accordingly, the rate of rise of the input speed is made lower than where the input torque is kept at the temporarily increased value, so that the risk of generation of the synchronizing shock can be reduced. In addition, the upper limit of the input torque to or below which the input torque is reduced is set such that the upper limit is smaller when the rate of change of the vehicle running speed is relatively low than when the rate of change is relatively high. Accordingly, the risk of generation of the synchronizing shock can be adequately reduced.

The control apparatus according to the fourth mode of the invention is configured in view of a fact that at the vehicle running speed lower than a lower limit below which the vehicle running speed cannot be accurately detected, the rate of change of the vehicle running speed may not be accurately calculated. In the present fourth mode of the invention, the amount of increase of the input torque of the step-variable transmission is set such that the amount of increase decreases with the decrease of the vehicle running speed. Accordingly, the amount of increase of the input torque of the step-variable transmission is set to be small when the vehicle running speed is extremely low, so that the amount of increase of the input torque is less likely to be influenced by inaccurate calculation of the rate of change of the vehicle running speed.

The control apparatus according to the fifth mode of the invention is configured in view of a fact that the working fluid used to operate the hydraulically operated coupling devices to selectively establish the gear positions of the step-variable transmission provides a resistance to rotary motions of rotary members in the step-variable transmission. In the present control apparatus, the torque increasing amount setting portion sets the amount of increase of the input torque of the step-variable transmission such that the amount of increase increases with a decrease of the temperature of the working fluid. Accordingly, the input speed of the step-variable transmission can be relatively easily raised irrespective of the resistance of the working fluid to the rotary motions of the rotary members.

The control apparatus according to the sixth mode of the invention is configured to control the hybrid vehicle wherein the electrically controlled transmission mechanism and the step-variable transmission are disposed in series with each other. The present control apparatus for the hybrid vehicle permits reduction of the synchronizing shock of the step-variable transmission, while reducing the slow progress of the coasting shift-down action of the step-variable transmission when the rate of change of the vehicle running speed is relatively low. Further, the shift control portion is configured to temporarily increase the input torque of the step-variable transmission beyond the required value, by temporarily increasing the output torque of the second motor/generator beyond the required value. Accordingly, the input torque of the step-variable transmission can be adequately increased by controlling the output torque of the second motor/generator, which can be more easily controlled with a higher degree of control response, than the output torque of the engine.

DETAILED DESCRIPTION OF PREFERRED EMBODIMENT

In the present specification, "a speed ratio" of each of the above-described step-variable transmission, and a transmission device consisting of the step-variable transmission and the above-described electrically controlled continuously-variable transmission mechanism which are disposed in series with each other is a ratio of a rotating speed of an input rotary member of the transmission or transmission device to a rotating speed of an output rotary member of the transmission or transmission device. A gear position or speed position of the transmission or transmission device which has a relatively low speed ratio is established or used for driving the vehicle at a relatively high running speed. On the other hand, a gear position or speed position of the transmission or transmission device which has a relatively high speed ratio is established or used for driving the vehicle at a relatively low running speed. For example, the gear position having the highest speed ratio is the lowest-speed gear position.

One preferred embodiment of this invention will be described in detail, by reference to the drawings.

Figure 1:
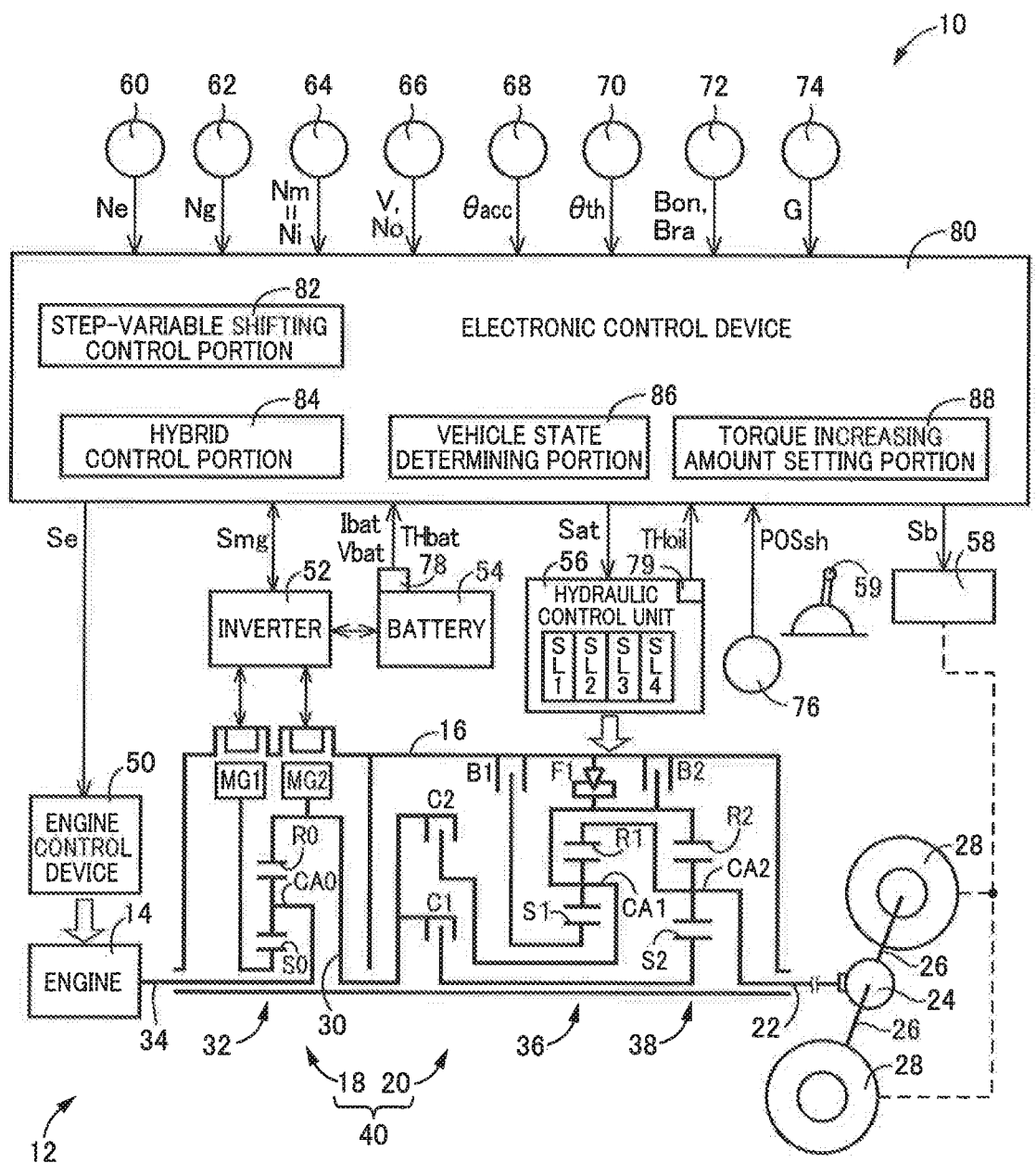
FIG. 1 is a schematic view showing an arrangement of a drive system of a vehicle to be controlled by a control apparatus according to one embodiment of the present invention, and major control functions and control portions of the control apparatus.

Reference is first made to FIG. 1, which is the schematic view showing an arrangement of a drive system 12 of a vehicle 10 to be controlled by a control apparatus according to the present invention, and major control functions and control portions of the control apparatus. As shown in FIG. 1, the vehicular drive system 12 is provided with an engine 14 functioning as a vehicle drive power source, an electrically controlled continuously-variable transmission portion 18, and a mechanically operated step-variable transmission portion 20. The continuously-variable transmission portion 18 and the step-variable transmission portion 20 are disposed in series with each other within a stationary member in the form of a transmission casing 16 fixed to a body of the vehicle 10 such that the transmission portions 18 and 20 are disposed coaxially with each other on a common axis. The electrically controlled continuously-variable transmission portion 18 is connected directly or indirectly through a damper (not shown), to the engine 14, while the mechanically operated step-variable transmission portion 20 is connected to an output rotary member of the electrically controlled continuously-variable transmission portion 18. The vehicular drive system 12 is further provided with a differential gear mechanism 24 connected to an output rotary member in the form of an output shaft 22 of the mechanically operated step-variable transmission portion 20, and a pair of axles 26 connected to the differential gear mechanism 24. In the vehicular drive system 12, a drive force generated by the engine 14 and a second motor/generator MG2 (described below) is transmitted to the mechanically operated step-variable transmission portion 20, and is transmitted from the mechanically operated step-variable transmission portion 20 to left and right drive Wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the transmission casing 16 will be hereinafter referred to simply as "casing 16", while the electrically controlled continuously-variable transmission portion 18 and the mechanically operated step-variable transmission portion 20 are hereinafter referred to respectively as the continuously-variable transmission portion 18 and the step-variable transmission portion 20. It is also noted that the drive force is considered equivalent to a torque or power, unless otherwise specifically distinguished from each other. It is further noted that the continuously-variable and step-variable transmission portions 18 and 20 are constructed substantially symmetrically with each other about the above-indicated common axis, and that FIG. 1 does not show the lower halves of the transmission portions

18 and 20. A crankshaft of the engine 14 and a connecting shaft 34 described below are coaxial with the above-indicated common axis.

The engine 14 is the drive power source to drive the vehicle 10, which is a known internal combustion engine such as a gasoline engine or a diesel engine. In the present embodiment, the engine 14 is a gasoline engine using a gasoline as the fuel. An engine torque Te which is an output torque of this engine 14 is controlled by an engine control device 50 which is controlled by an electronic control device 80 described below. The engine control device 50 includes an electronic throttle valve, a fuel injection device and an igniting device, which are provided on the vehicle 10. In the present embodiment, the engine 14 is connected to the continuously-variable transmission portion 18, without a fluid-operated type power transmitting device such as a torque converter or a fluid coupling being disposed between the engine 14 and the continuously-variable transmission portion 18.

The continuously-variable transmission portion 18 is provided with: a first motor/generator MG1; a power distributing mechanism in the form of a differential mechanism 32 configured to mechanically distribute the drive force of the engine 14 to the first motor/generator MG1, and to an intermediate power transmitting member 30 which is the output rotary member of the continuously-variable transmission portion 18. The second motor/generator MG2 is operatively connected to the intermediate power transmitting member 30 in a power transmittable manner. The continuously-variable transmission portion 18 is an electrically controlled continuously-variable transmission wherein a differential state of the differential mechanism 32 is controllable by controlling an operating state (torque, etc.) of the first motor/generator MG1. The first motor/generator MG1 functions as a differential motor/generator which permits controlling of an engine speed Ne, namely, an operating speed of the engine 14. On the other hand, the second motor/generator MG2 is a motor/generator which functions as the vehicle drive power source, namely, a vehicle driving electric motor. The vehicle 10 is a hybrid vehicle provided with the vehicle drive power source in the form of the engine 14 and the second motor/generator MG2. The operating state of the first motor/generator MG1 is controlled in a predetermined manner.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 54 through an inverter 52. The inverter 52 and the battery 54 are provided on the vehicle 10, and the inverter 52 is controlled by the above-indicated electronic control device 80, to control an output torque of the first motor/generator MG1, namely, an MG1 torque Tg, and an output torque of the second motor/generator MG2, namely, an MG2 torque Tm. Positive values of the MG1 torque Tg and MG2 torque Tm acting to accelerate the vehicle 10 are vehicle driving torques, while negative values of the MG1 torque Tg and MG2 torque Tm acting to decelerate the vehicle 10 are regenerative torques. The battery 54 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through the connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions an output rotary element.

The step-variable transmission portion 20 is a mechanically operated transmission mechanism functioning as a step-variable transmission constituting a part of a power transmitting path between the intermediate power transmitting member 30 and the drive wheels 28, namely, a mechanically operated transmission mechanism constituting a part of a power transmitting path between the continuously-variable transmission portion 18 and the drive wheels 28. The intermediate power transmitting member 30 also functions as an input rotary member of the step-variable transmission portion 20. The intermediate power transmitting member 30 is connected to the second motor/generator MG2 such that the intermediate power transmitting member 30 and a rotor of the second motor/generator MG2 are rotated as a unit. Further, the engine 14 is connected to an input rotary member of the continuously-variable transmission portion 18. Accordingly, the step-variable transmission portion 20 is a transmission constituting a part of a power transmitting path between the drive power source in the form of the second motor/generator MG2 and the engine 14, and the drive wheels 28. The intermediate power transmitting member 30 is a power transmitting member for transmitting the drive force of the drive power source to the drive wheels 28. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 as well as a one-way clutch F1. The clutches C1 and C2 and the brakes B1 and B2 will be hereinafter simply referred to as "coupling devices CB" unless otherwise specified.

Each of the coupling devices CB is a hydraulically operated frictional coupling device in the form of a multiple-disc type or a single-disc type clutch or brake, or a band brake, which is operated by a hydraulic actuator. The coupling devices CB are selectively placed in their engaged or released states with their torque capacities or engaging torques Tcb being changed according to engaging hydraulic pressures PRcb applied thereto, which are regulated by respective solenoid-operated valves SL1-SL4 incorporated within a hydraulic control unit 56. To permit an input torque Ti of the step-variable transmission portion 20 to be transmitted between the intermediate power transmitting member 30 and the output shaft 22, without slipping actions of the coupling devices CB placed in the engaged states, a sum of the engaging torques Tcb of these coupling devices CB is required to be equal to the input torque Ti, which is a sum of the torques to be transmitted through the respective coupling devices CB. In this respect, it is noted that the maximum torques to be transmitted through the coupling devices CB will not be increased by increasing the engaging torques Tcb after the torques to be transmitted through the coupling devices CB have been increased to the maximum values. Namely, the required engaging torques Tcb are equal to the maximum torques that can be actually transmitted through the coupling devices CB. It is also noted that the coupling devices CB are considered to have no slipping actions where there is not a difference between rotating speeds of two coupling rotary elements of each coupling device CB. The engaging torques Tcb and the engaging hydraulic pressures PRcb are substantially proportional to each other, after the engaging hydraulic pressures PRcb have been raised to fill the hydraulic actuators for the coupling devices CB.

In principle, the one-way clutch F1 is automatically brought into its engaged state when the input torque Ti of the step-variable transmission portion 20 is a positive torque, that is, in a forward driving state of the vehicle 10, and is automatically brought into its released state when the input torque Ti is a negative torque, that is, in a coasting state of the vehicle 10.

In the step-variable transmission portion 20, selected ones of rotary elements of the first and second planetary gear sets 36 and 38 are connected to each other or to the intermediate power transmitting member 30, casing 16 or output shaft 22, either directly or indirectly through the coupling devices CB or the one-way clutch F1. The first planetary gear set 36 is provided with the rotary elements in the form of a sun gear S1, a carrier CA1 and a ring gear R1, while the second planetary gear set 38 is provided with the rotary elements in the form of a sun gear S2, a carrier CA2 and a ring gear R2.

The step-variable transmission portion 20 is shifted to a selected one of four gear positions (speed positions) by engaging actions of selected ones of the coupling devices CB. These four gear positions have respective different speed ratios γat (=AT input speed Ni/output speed No). Namely, the step-variable transmission portion 20 is shifted up and down from one gear position to another by placing selected ones of the coupling devices CB in their engaged states. That, is, the step-variable transmission portion 20 is a step-variable automatic transmission having a plurality of gear or speed positions. In the present embodiment, the plurality of gear positions established by the step-variable transmission portion 20 will be referred to as "AT gear positions". The AT input speed Ni is a rotating speed of the input rotary member of the step-variable transmission portion 20, that is, an input speed of the step-variable transmission portion 20, which is equal to a rotating speed of the intermediate power transmitting member 30, and to an MG2 speed Nm which is the operating speed of the second motor/generator MG2. The AT input speed Ni is represented by the MG2 speed Nm. On the other hand, the output speed No is a rotating speed of the output shaft 22 of the step-variable transmission portion 20, that is, an output speed of the step-variable transmission portion 20, which is considered to be an output speed of a transmission device 40 which consists of the continuously-variable transmission portion 18 and the step-variable transmission portion 20. In the present embodiment, the transmission device 40 as a whole serves as an automatic transmission constituting the part of the power transmitting path between the engine 14 and the drive wheels 28.

Figures 2, 3:
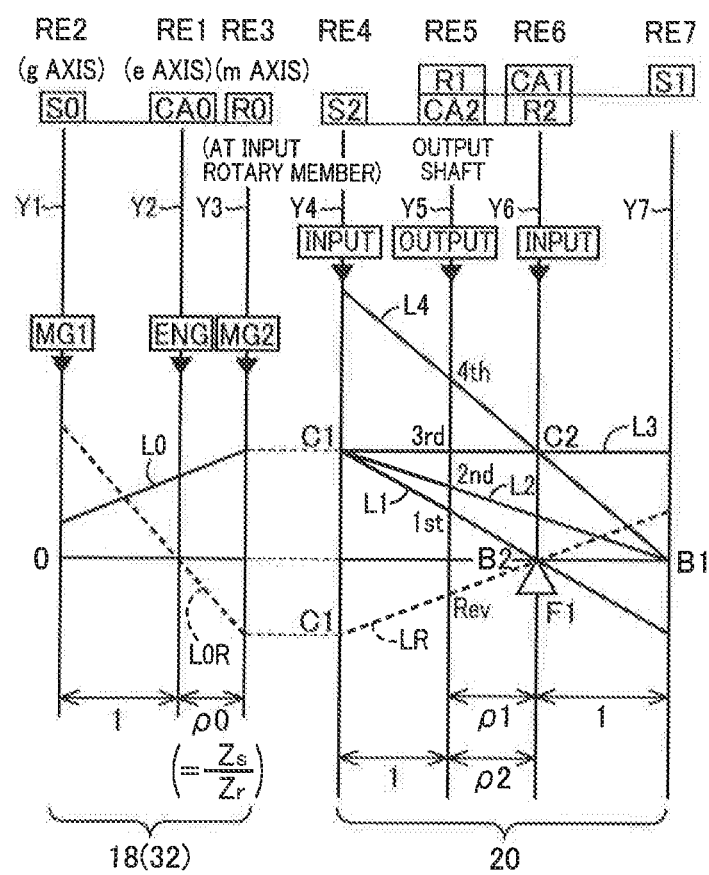
FIG. 2 is a table indicating a relationship between AT gear positions of a mechanically operated step-variable transmission portion shown in FIG. 1 and combinations of coupling devices placed in engaged states to establish the respective AT gear positions.
FIG. 3 is a collinear chart indicating a relationship among rotating speeds of rotary elements of an electrically controlled continuously-variable transmission portion and the mechanically operated step-variable transmission portion.

Reference is now made to FIG. 2, which is the table indicating the relationship between the first through fourth AT gear positions of the step-variable transmission portion 20 and combinations of the coupling devices CB placed in the engaged states to establish the respective AT gear positions. In the table of FIG. 2, the four AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$".

In the table, "◯" indicates the engaged states of the coupling devices CB, "Δ" indicates the engaged states of the coupling device B2 during application of an engine brake to the vehicle 10 or during a coasting shift-down action of the step-variable transmission portion 20 during a coasting run of the vehicle 10, while the blank indicates the released state of the coupling devices CB.

The one-way clutch F1 indicated above is disposed parallel to the brake B2 which is placed in the engaged state to establish the first speed AT gear position "$1^{st}$". Accordingly, the first speed AT gear position "$1^{st}$" is established with the engaging action of the brake B2 or alternatively the engaging action of the one-way clutch F1. Thus, the brake B2 is not required to be placed in the engaged state upon starting or acceleration of the vehicle 10. Namely, the first speed AT gear position "$1^{st}$" can be established with the engaging action of the clutch C1 together with the automatic engaging action of the one-way clutch F1.

The step-variable transmission portion 20 may perform two kinds of power-off shift-down actions, one of which takes place upon reduction of an operation amount θacc of an accelerator pedal, and the other of which takes place upon an operation of the accelerator pedal to its non-operated or fully released position, namely, upon zeroing or substantially zeroing of the accelerator pedal operation amount θacc. The above-indicated coasting shift-down action of the step-variable transmission portion 20 is the latter kind of power-off shift-down action taking place during the above-indicated coasting run of the vehicle 10 while the accelerator pedal is placed in its fully released position. It is noted that the step-variable transmission portion 20 is placed in its neutral state when all of the coupling devices CB are placed in their released states. In this neutral state, a drive force cannot be transmitted through the step-variable transmission portion 20. Since the one-way clutch F1 is an automatically engaged and released clutch, the step-variable transmission portion 20 is brought into its neutral state by the engaging actions of all of the coupling devices CB. It is also noted that when a determination that a shift-down action of the step-variable transmission portion 20 should be performed is made, the step-variable transmission portion 20 is required to be shifted down.

The step-variable transmission portion 20 is shifted up or down to establish a newly selected one of the four AT gear positions, according to the operation amount θacc of the accelerator pedal by an operator of the vehicle 10 and the running speed V of the vehicle 10, with a releasing action of one of the coupling devices CB and a concurrent engaging action of another coupling device CB, which concurrent releasing and engaging actions are controlled by the above-indicated electronic control device 80. The above-indicated one coupling device CB (referred to as a "releasing-side coupling device CB") was placed in the engaged state before the step-variable transmission portion 20 is shifted to establish the newly selected AT gear position, while the above-indicated another coupling device CB (referred to as an "engaging-side coupling device CB") was placed in the released state before the step-variable transmission portion 20 is shifted to establish the newly selected AT gear position. Thus, the step-variable transmission portion 20 is shifted up or down from one of the AT gear positions to another by so-called "clutch-to-clutch" shifting operation, namely, concurrent releasing and engaging actions of the releasing-side and engaging-side coupling devices CB. For example, a shift-down action of the step-variable transmission portion 20 from the second speed AT gear position "$2^{nd}$" to the first speed AT gear position "$1^{st}$" is implemented by the concurrent releasing and engaging actions of the respective brakes B1 and B2, as is apparent from the table of FIG. 2. In the process of this shift-down action, the transient hydraulic pressure of the brake B1 (releasing-side coupling device CB) to be brought into its released state and the transient hydraulic pressure of the brake B2 (engaging-side coupling device CB) to be brought into its engaged state are suitably regulated. The releasing-side coupling device CB to be brought into its released state to establish the newly selected AT gear position was placed in the engaged state before initiation of the shift-down action, while the engaging-side coupling device CB to be brought into its engaged state to establish the newly selected AT gear position was placed in the released state before initiation of the shift-down action. It is noted that the shift-down action from the second speed AT gear position "$2^{nd}$" to the first speed AT gear position "$1^{st}$" can also be implemented with the automatic engaging action of the one-way clutch F1 which takes place concurrently with the releasing action of the releasing-side coupling device CB in the form of the brake B1.

The collinear chart of FIG. 3 indicates a relationship among rotating speeds of the rotary elements of the continuously-variable transmission portion 18 and the step-variable transmission portion 20. In this collinear chart of FIG. 3, three vertical lines Y1, Y2 and Y3 corresponding to the respective three rotary elements of the differential mechanism 32 of the continuously-variable transmission portion 18 respectively represent a "g" axis representing the rotating speed of a second rotary element RE2 in the form of the sun gear S0, an "e" axis representing the rotating speed of a first rotary element RE1 in the form of the carrier CA0, and an "m" axis representing the rotating speed of a third rotary element RE3 in the form of the ring gear R0. Further, four vertical lines Y4, Y5, Y6 and Y7 corresponding to the respective four rotary elements of the step-variable transmission portion 20 respectively represent an axis representing the rotating speed of a fourth rotary element RE4 in the form of the sun gear S2, an axis representing the rotating speed of a fifth rotary element RE5 in the form of the ring gear R1 and the carrier CA2 fixed to each other, namely, the rotating speed of the output shaft 22, an axis representing the rotating speed of a sixth rotary element RE6 in the form of the carrier CA1 and the ring gear R2 fixed to each other, and an axis representing the rotating speed of a seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously-variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart of FIG. 3 which corresponds to the continuously-variable transmission portion 18, straight lines L0 and L0R intersecting the vertical line Y2 represent a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart which corresponds to the step-variable transmission portion 20, straight lines L1, L2, L3, L4 and LR intersecting the vertical line Y5 represent the rotating speeds of the output shaft 22 in the respective first, second, third and fourth speed AT gear positions "$1^{st}$", "$2^{nd}$", "$3^{rd}$" and "$4^{th}$", and a rear drive position "Rev".

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as the drive power source. In the differential mechanism 32 placed in this hybrid drive mode, the engine torque Te is applied to the carrier CA0 while a reaction torque (i.e. regenerative torque) which is a negative torque generated by the first motor/generator MG1 is applied to the sun gear S0 so as to rotate the sun gear S0 in the positive direction. As a result, a directly transmitted engine torque Td ($=Te/(1+\rho 0)=-(1/\rho 0)\times Tg$) which is a positive torque is applied to the ring gear R0 so as to rotate the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to an operator-required vehicle drive force. At this time, the first motor/generator MG1 functions as an electric generator operated in the positive direction to generate a negative torque. An electric power Wg generated by the first motor/generator MG1 is stored in the battery 54 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 54.

In the differential mechanism 32 placed in a motor drive mode in which the vehicle 10 is driven with a drive force generated by the second motor/generator MG2 operated as the drive power source while the engine 14 is held at rest, the carrier CA0 is held stationary while the MG2 torque Tm which is a positive torque is applied to the ring gear R0 so as to rotate the ring gear R0 in the positive direction. At this time, the first motor/generator MG1 connected to the sun gear S0 is placed in a non-load state and freely operated in the negative direction. Namely, in the motor drive mode, the engine 14 is held in the non-operated state, so that the engine speed Ne is kept substantially zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR shown in the collinear chart of FIG. 3 represent the relative rotating speeds of the various rotary elements of the continuously-variable and step-variable transmission portions 18 and 20 during running of the vehicle 10 in the rearward direction in the motor drive mode. During this running of the vehicle 10 in the rearward direction in the motor drive mode, the MG2 torque Tm which is a negative torque is applied to the ring gear R0 so as to rotate the ring gear R0 in the negative direction, and is transmitted as the rearward driving torque to the drive wheels 28 through the step-variable transmission portion 20 placed in the first speed AT gear position. The vehicle 10 can be driven in the rearward direction with the rearward driving MG2 torque Tm which is the negative torque generated by the second motor/generator MG2 under the control of the electronic control device 80 and which is opposite to the positive forward driving torque generated while the step-variable transmission portion 20 is placed in the forward low-speed AT gear position, for instance, in the first speed AT gear position "$1^{st}$". The forward driving MG2 torque Tm is the positive vehicle driving torque for rotating the drive wheels 28 in the positive direction, while the rearward driving MG2 torque Tm is the negative vehicle driving torque for driving the drive wheels 28 in the negative direction. Thus, the vehicle 10 is driven in the rearward direction with the negative MG2 torque Tm generated while the step-variable transmission portion 20 is placed in the suitably selected forward driving AT gear position, which is also used to drive the vehicle 10 in the forward direction. In the hybrid drive mode, too, the second motor/generator MG2 can be operated in the negative direction, as indicated by the straight line L0R, so that the vehicle 10 can be driven in the rearward direction in the hybrid drive mode, as in the motor drive mode.

In the vehicular drive system 12, the continuously-variable transmission portion 18 functions as an electrically controlled transmission mechanism provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is operatively connected in a power transmittable manner. The third rotary element RE3 to which the intermediate power transmitting member 30 is connected may be considered to be the third rotary element RE3 to which the second motor/generator MG2 is operatively connected in a power transmittable manner. Namely, the continuously-variable transmission portion 18 provided in the vehicular drive system 12 has the differential mechanism 32 to which the engine 14 is operatively connected in a power transmittable manner, and the first motor/generator MG1 to which the differential mechanism 32 is operatively connected in a power transmittable manner such that the differential state of the differential mechanism 32 is controlled according to the operating state of the first motor/generator MG1. The continuously-variable transmission portion 18 is operated as an electrically controlled continuously-variable transmission a speed ratio $\gamma 0$ ($=Ne/Nm$) of which is variable. The speed ratio is a ratio of the engine speed Ne equal to a rotating speed of the connecting shaft 34 (which is the input rotary member of the continuously-variable transmission portion 18), with respect to the MG2 speed Nm equal to the rotating speed of the intermediate power transmitting member 30 (which is the output rotary member of the continuously-variable transmission portion 18).

In the hybrid drive mode, for instance, the rotating speed of the sun gear S0 is raised or lowered by controlling an operating speed of the first motor/generator MG1 while the rotating speed of the ring gear R0 is determined by a rotating speed of the drive wheels 28 with the step-variable transmission portion 20 placed in one of the AT gear positions, so that the rotating speed of the carrier CA0 (namely, engine speed Ne) is accordingly raised or lowered. In the hybrid drive mode, therefore, the engine 14 can be operated in an efficiently operating state. That is, the step-variable transmission portion 20 to be placed in a selected one of the AT gear positions and the continuously-variable transmission portion 18 functioning as a continuously-variable transmission cooperate to provide the transmission device 40 in which the continuously-variable transmission portion 18 and the step-variable transmission portion 20 are disposed in series with each other and which functions as a continuously-variable transmission as a whole.

Alternatively, the continuously-variable transmission portion 18 can be shifted like a step-variable transmission. Accordingly, the transmission device 40 constituted by the step-variable transmission portion 20 to be placed in one of the AT gear positions and the continuously-variable transmission portion 18 which can be shifted like the step-variable transmission can be shifted like a step-variable transmission as a whole. That is, the step-variable transmission portion 20 and the continuously-variable transmission portion 18 can be controlled to selectively establish a plurality of speed positions (hereinafter referred to as "overall speed positions") having respective different values of a speed ratio $\gamma t$ ($=Ne/No$) which is a ratio of the engine speed Ne to the output speed No. The speed ratio $\gamma t$ is an overall speed ratio of the transmission device 40 consisting of the continuously-variable transmission portion 18 and the step-variable transmission portion 20 which are disposed in series with each other. The overall speed ratio $\gamma t$ is equal to a product of the speed ratio $\gamma 0$ of the continuously-variable transmission portion 18 and the speed ratio $\gamma at$ of the step-variable transmission portion 20, namely, $\gamma t=\gamma 0 \times \gamma at$.

Figures 4, 5:
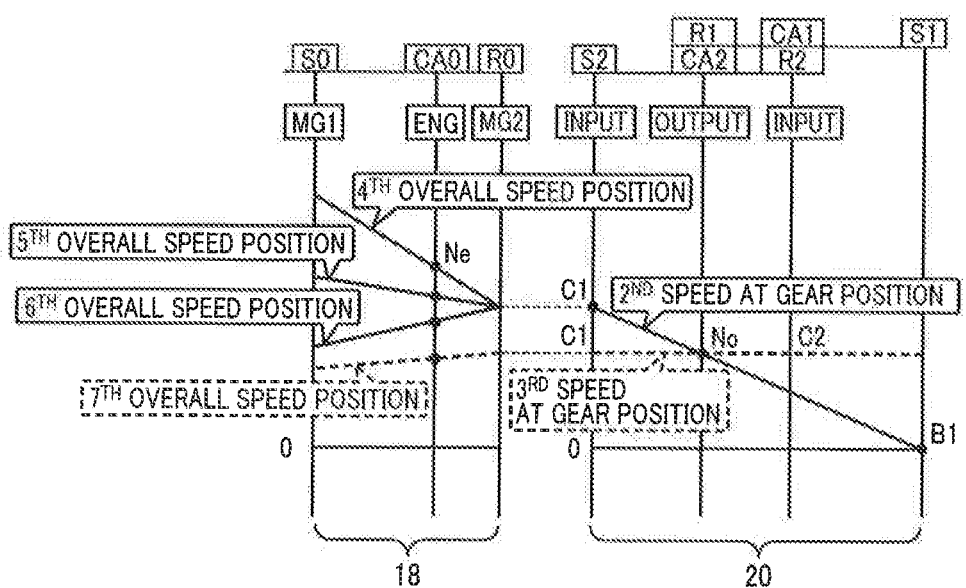
FIG. 4 is a table indicating an example of a plurality of overall speed positions of a transmission device in relation to the gear positions of the step-variable transmission portion.
FIG. 5 is a view indicating some examples of the gear positions of the mechanically operated step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously-variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In the collinear chart of FIG. 5, solid lines indicate the fourth through sixth overall speed positions established when the step-variable transmission portion 20 is placed in the second speed AT gear position. In the transmission device 40, the continuously-variable transmission portion 18 is controlled to control the engine speed Ne with respect to the output speed No for establishing the predetermined overall speed ratio values γt, to thereby establish the overall speed position or positions for each of the AT gear positions. A broken line indicates the seventh overall speed position established when the step-variable transmission portion 20 is placed in the third speed AT gear position. In the transmission device 40, the continuously-variable transmission portion 18 is controlled according to the selected one of the AT gear positions, for shifting the transmission device 40 from one of the overall speed positions to another.

Referring back to FIG. 1, the vehicle 10 is provided with a wheel braking device 58 which has wheel brakes for applying braking torques to the respective wheels (drive wheels 28, and driven wheels not shown). The wheel brakes have respective wheel braking hydraulic cylinders to which braking hydraulic pressures are applied according to an operation of a brake pedal by the vehicle operator. In a normal control mode of the vehicle 10, the wheel braking device 58 is operated such that a pressurized fluid the pressure of which corresponds to an operating force acting on the brake pedal is supplied from a master cylinder directly to the wheel braking hydraulic cylinders. In a special control mode of the vehicle 10 such as an ABS (anti-lock braking control mode) and a vehicle speed control mode, for instance, the braking hydraulic pressure to be applied to each of the wheel braking hydraulic cylinder or cylinders is controlled irrespective of the operating force of the brake pedal.

The vehicle 10 is provided with the control apparatus of the present invention in the form of the electronic control device 80 configured to control various devices of the vehicle 10 such as the engine 14, continuously-variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 is a so-called microcomputer incorporating a CPU, a ROM, a RAM and an input-output interface. The CPU performs various controls of the vehicle 10, by implementing various input signal processings, according to control programs stored in the ROM, while utilizing a temporary data storage function of the RAM. The electronic control device 80 may be constituted by two or more control units exclusively assigned to perform different controls such as engine controls and transmission shifting controls.

The electronic control device 80 receives various input signals such as: an output signal of an engine speed sensor 60 indicative of the engine speed Ne; an output signal of an MG1 speed sensor 62 indicative of an MG1 speed Ng which is the operating speed of the first motor/generator MG1; an output signal of an MG2 speed sensor 64 indicative of the MG2 speed Nm which is the AT input speed Ni; an output signal of an output speed sensor 66 indicative of the output speed No corresponding to the vehicle running speed V; an output signal of an accelerator pedal operation amount sensor 68 indicative of the operation amount θacc of a vehicle accelerating member in the form of the accelerator pedal; an output signal of a throttle valve opening angle sensor 70 indicative of an angle θth of opening of the above-indicated electronic throttle valve; output signals of a brake pedal sensor 72 indicative of a state of operation Bon and an amount Bra of operation of the brake pedal by the vehicle operator; an output signal of a G sensor 74 indicative of a longitudinal acceleration value G of the vehicle 10; an output signal of a shift position sensor 76 indicative of a presently selected operating position POSsh of a shift lever 59; output signals of a battery sensor 78 indicative of a temperature THbat, a charging/discharging electric current Ibat and a voltage Vbat of the battery 54; and an output signal of an oil temperature sensor 79 indicative of a temperature THoil of a working fluid to be supplied to the hydraulic actuators of the coupling devices CB.

The operation amount θacc of the accelerator pedal provided as the vehicle accelerating member represents a degree of acceleration of the vehicle 10 required by the vehicle operator, and therefore a vehicle drive force or output which is required by the vehicle operator. The angle θth of opening of the electronic throttle valve may be used as the operator-required vehicle drive force or output, instead of the operation amount θacc of the accelerator pedal.

The longitudinal acceleration value G of the vehicle 10 represents a value of acceleration or deceleration of the vehicle 10 during its forward running. This value G is positive in an accelerating run of the vehicle 10 with an increase of the running speed V, and negative in a decelerating run of the vehicle 10 with a decrease of the running speed V. The degree of deceleration of the vehicle 10 increases with an increase of an absolute value of the negative longitudinal acceleration value G.

The electronic control device 80 generates various output signals such as: engine control command signals Se to be applied to an engine control device 50, for controlling the engine 14; motor/generator control command signals Smg to be applied to the inverter 52, for controlling the first motor/generator MG1 and the second motor/generator MG2; hydraulic control command signals Sat to be applied to the hydraulic control unit 56, for controlling the operating states of the coupling devices CB; and brake control command signals Sb to be applied to the wheel braking device 58, for controlling the wheel braking torques to be applied to the wheel brakes. The hydraulic control command signals Sat are command signals for controlling the solenoid-operated valves SL1-SL4 to regulate the engaging hydraulic pressures PRcb to be applied to the respective hydraulic actuators of the coupling devices CB, for shifting the step-variable transmission portion 20. The electronic control device 80 operates to set a hydraulic pressure command value corresponding to the engaging hydraulic pressure PRcb to be applied to each of the hydraulic actuators, for establishing a desired amount of the engaging torque Tcb of the corresponding coupling device CB, and applies to the hydraulic control unit 56 an electric current or voltage command signal corresponding to the hydraulic pressure command value.

The electronic control device 80 calculates a charged state value SOC [%] of the battery 54 (an amount of electric power stored in the battery 54) on the basis of the charging/discharging electric current Ibat and the voltage Vbat of the battery 54. The electronic control device 80 also calculates a lower limit Win of a battery power Pbat below which the battery 54 can be charged, and an upper limit Wout above which the battery 54 can be discharged. These lower and upper limits Win and Wout are calculated on the basis of the battery temperature THbat and the charged state SOC %, for example. Charging and discharging controls of the battery 54 are implemented such that the battery power Pbat is held within a range between the calculated lower and upper limits Win and Wout. The range between the lower and upper limits Win and Wout is narrowed as the battery temperature THbat is lowered below a lower limit of a normal operating range of the battery 54, or as the battery temperature THbat is raised above an upper limit of the normal operating range. The lower limit Win is decreased with an increase of the charged state value SOC above a predetermined upper limit, while the upper limit Wout is decreased with a decrease of the charged state value SOC below a predetermined lower limit.

The electronic control device 80 includes a shift control means in the form of a step-variable shifting control portion 82, and a hybrid control means in the form of a hybrid control portion 84, for implementing various controls of the vehicle 10.

The step-variable shifting control portion 82 is configured to determine a shifting action of the step-variable transmission portion 20 according to a memory-stored AT gear position shifting map obtained by experimentation or determined by an appropriate design theory, and to implement a shifting control for controlling the step-variable transmission portion 20 to perform the determined shifting action. In this shifting control, the step-variable shifting control portion 82 applies the hydraulic control command signals Sat to the hydraulic control unit 56, for commanding the solenoid-operated valves SL1-SL4 to bring the appropriate ones of the coupling devices CB into the released and engaged states, for automatically shifting up or down the step-variable transmission portion 20. The AT gear position shifting map indicated above represents a predetermined relationship between two variables in the form of the output speed No and the accelerator pedal operation amount θacc, which relationship is used to determine a shifting action of the step-variable transmission portion 20 and is represented by shift-up and shift-down shifting lines in a two-dimensional coordinate system in which the output speed No and the accelerator pedal operation amount θacc are taken along respective two axes. The output speed No may be replaced by the vehicle running speed V, and the accelerator pedal operation amount θacc may be replaced by an operator-required vehicle drive torque Tdem or the throttle valve opening angle θth. The shifting lines of the AT gear position shifting map consist of shift-up lines for determining shift-up actions of the step-variable transmission portion 20, and shift-down lines for determining shift-down actions of the step-variable transmission portion 20. Each of the shifting lines is defined by a series of shifting points which are determined such that the step variable transmission portion 20 should be shifted up or down when the output speed No becomes higher or lower than the shifting point at a given value of the accelerator pedal operation amount θacc, or when the accelerator pedal operation amount θacc becomes larger or smaller than the shifting point at a given value of the output speed No.

The hybrid control portion 84 has a function of an engine control means or portion to control the engine 14, and a function of a motor/generator control means or portion to control the first motor/generator MG1 and the second motor/generator MG2 through the inverter 52. Thus, the hybrid control portion 84 performs hybrid drive controls for controlling the engine 14, first motor/generator MG1 and second motor/generator MG2. The hybrid control portion 84 is configured to calculate an operator-required vehicle drive power Pdem on the basis of the accelerator pedal operation amount θacc and the vehicle running speed V, and according to a predetermined relationship in the form of a drive force map, for instance. In other words, the hybrid control portion 84 calculates the operator-required vehicle drive torque Tdem at the present vehicle running speed V. The hybrid control portion 84 generates the engine control command signals Se to control the engine 14, and the motor/generator control command signals Smg to control the first motor/generator MG1 and the second motor/generator MG2, while taking account of the upper and lower limits Wout and Win, for establishing the operator-required vehicle drive power Pdem. For example, the engine control command signals Se represent an engine power Pe which is the torque Te of the engine 14 at its present operating speed Ne. For example, the motor/generator control command signals Smg represent an electric power amount Wg to be generated by the first motor/generator MG1 to generate the reaction torque with respect to the engine torque Te, namely, the MG1 torque Tg at the present MG1 speed Ng, and an electric power amount Wm to be consumed by the second motor/generator MG2 to generate the MG2 torque Tm at the present MG2 speed Nm.

When the transmission device 40 as a whole is operated as the continuously-variable transmission while the continuously-variable transmission portion 18 is operated as the continuously-variable transmission, for instance, the hybrid control portion 84 controls the engine 14 and the electric power amount Wg to be generated by the first motor/generator MG1, so as to establish the engine speed Ne and the engine torque Te for obtaining the engine power Pe to establish the operator-required vehicle drive power Pdem, while taking account of a highest fuel economy point of the engine 14, so that the speed ratio γ0 of the continuously-variable transmission portion 18 is controlled so as to be continuously varied. As a result, the speed ratio γt of the transmission device 40 is controlled while the continuously-variable transmission portion 18 is operated as the continuously-variable transmission.

Where the transmission device 40 as a whole is shifted as a step-variable transmission while the continuously-variable transmission portion 18 is shifted as a step-variable transmission, the hybrid control portion 84 determines a shifting action of the transmission device 40 according to an overall speed position shifting map, and performs a shifting control of the continuously-variable transmission portion 18 to establish a selected one of the plurality of overall speed positions, in cooperation with the step-variable shifting control portion 82 to shift the step-variable transmission portion 20 selectively to the AT gear positions. The plurality of overall speed positions can be established by controlling the first motor/generator MG1 to control the engine speed Ne according to the output speed No so as to maintain the respective speed ratio values γt. Each of the speed ratio values γt of the overall speed positions need not be constant over the entire range of the output speed No, and may have different values in respective regions of the output speed No, or may be limited depending upon upper and lower limits of rotating speeds of various parts of the step-variable transmission portion 20. Thus, the hybrid control portion 84 can control the transmission device 40 so as to be shifted to the selected one of the overall speed positions by controlling the engine speed Ne.

Figure 6:
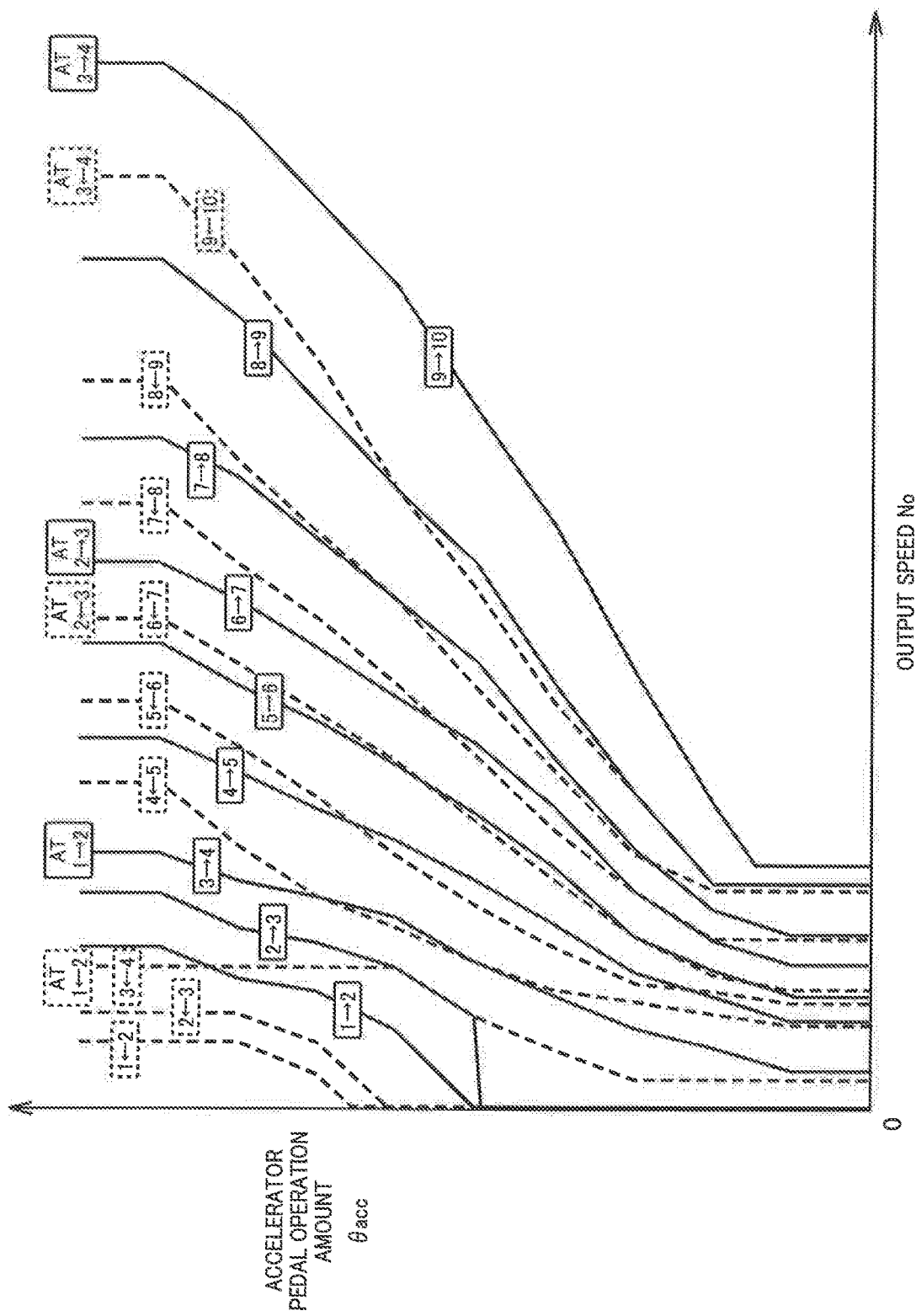
FIG. 6 is a view illustrating examples of an AT gear position shifting map and an overall speed position shifting map used to shift up and down the transmission device.

Like the AT gear position shifting map, the above-indicated overall speed position shifting map represents a predetermined relationship between the output speed No and the accelerator pedal operation amount θacc. FIG. 6 shows an example of the overall speed position shifting map. In FIG. 6, solid lines indicate shift-up boundary lines while broken lines indicate shift-down boundary lines. The transmission device 40 consisting of the continuously-variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously-variable shifting control of the transmission device 40 as the continuously-variable transmission as a whole, only when a sporty drive mode or any other high-drivability drive mode is selected, by the vehicle operator, or only when the operator-required vehicle drive torque Tdem is comparatively large, but may be principally implemented except where the overall step-variable shifting control is restricted or inhibited.

The overall speed position shifting control by the hybrid control portion 84 and the step-variable shifting control by the step-variable shifting control portion 82 are implemented in cooperation with each other. In this embodiment, the ten overall speed positions, that is, the first through tenth overall speed positions are established for the four AT gear positions, that is, the first through fourth speed AT gear positions. The AT gear position shifting map is defined such that an AT gear position shifting operation is performed in synchronization with an overall speed position shifting operation. Described more specifically, the shift-up lines for shifting up the transmission device 40 from the third overall speed position to the fourth overall speed position (3→4), from the sixth overall speed position to the seventh overall speed position (6→7), and from the ninth overall speed position to the tenth overall speed position (9→10) are respectively coincident with the shift-up lines for shifting up the step-variable transmission portion 20 from the first speed AT gear position to the second speed AT gear position (1→2), from the second speed AT gear position to the third speed AT gear position (2→3), and from the third speed AT gear position to the fourth speed AT gear position (3→4). For instance, the overall speed position shift-up line 3→4 is coincident with the AT gear position shift-up line AT1→2, as indicated in FIG. 6. Further, the shift-down lines for shifting down the transmission device 40 from the fourth overall speed position to the third overall speed position (3←4), from the seventh overall speed position to the sixth overall speed position (6←7), and from the tenth overall speed position to the ninth overall speed position (9←10) are respectively coincident with the shift-down lines for shifting down the step-variable transmission portion 20 from the second speed AT gear position to the first speed AT gear position (1←2), from the third speed AT gear position to the second speed AT gear position (2←3), and from the fourth speed AT gear position to the third speed AT gear position (3←4). For instance, the overall speed position shift-down line 3←4 is coincident with the AT gear position shift-down line AT1←2, as also indicated in FIG. 6. Alternatively, a command to shift the step-variable transmission portion 20 may be applied to the step-variable shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The step-variable shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed Ne, so that the vehicle operator is less likely to uncomfortably recognize a shifting shock of the step-variable transmission portion 20.

The hybrid control portion 84 selectively establishes the motor drive mode or the hybrid drive mode, depending upon the running state of the vehicle 10. For example, the hybrid control portion 84 selects the motor drive mode when the operator-required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 54 is smaller than a predetermined engine-starting threshold value. In the motor drive mode, the vehicle 10 is driven with a drive torque generated by the second motor/generator MG2 while the engine 14 is held at rest. In the hybrid drive mode, the engine 14 is operated as needed. The engine-starting threshold value indicated above is predetermined as a lower limit, of the electric power amount SOC below which the battery 54 should be charged by starting the engine 14.

An operation to control the coasting shift-down action of the step-variable transmission portion 20 will be described in detail. In the process of a power-off shift down action in the form of a coasting shift-down action of the step-variable transmission portion 20, the AT input speed Ni cannot be raised to a synchronization speed in the AT gear position to be established after the coasting shift-down action, while the engaging torque Tcb is not generated by the coupling device CB which is brought into its engaged state to perform the coasting shift-down action for establishing the above-indicated AT gear position. On the other hand, the AT input speed Ni is raised toward the above-indicated synchronization speed to permit a progress of the coasting shift-down action, by controlling the engaging-side coupling device CB to generate the engaging torque Tcb, or by temporarily increasing the AT input torque Ti beyond a required value Tidem. In the present embodiment, the coasting shift-down action of the step-variable transmission portion 20 is controlled with a temporary increase of its AT input torque Ti while both of the releasing-side and engaging-side coupling devices CB are placed in free states without generation of the engaging torques Tcb. The synchronization speed of the AT input speed Ni in the AT gear position to be established after the coasting shift-down action will be referred to as a "post-shifting synchronization speed Nisyca (=No×γata)", while the synchronization speed of the AT input speed Ni in the AT gear position to be established before the coasting shift-down action will be referred to as a "pre-shifting synchronization speed Nisycb (=No×γatb)". "γata" represents the speed ratio of the step-variable transmission portion 20 placed in the AT gear position to be established after the coasting shift-down action while "γath" represents the speed ratio of the step-variable transmission portion 20 placed in the AT gear position established before the coasting shift-down action. The required value Tidem of the AT input torque Ti is a torque value calculated by conversion as a torque value of the intermediate power transmitting member 30. In this respect, it is noted that the required torque value Tidem is changed according to a change of the accelerator pedal operation amount θacc, so that a smoothed value of the calculated torque value of the intermediate power transmitting member 30 may be used as the required AT input torque value Tidem.

The coasting shift-down action (2→1) of the step-variable transmission portion 20 from the second speed AT gear position to the first speed AT gear position will be described as an example of the coasting shift-down action to the first speed AT gear position.

The step-variable shifting control portion 82 implements a shifting control of the coasting shift-down action (2→1) by bringing the releasing-side coupling device CB in the form of the brake B1 into its released state while at the same time temporarily increasing the AT input torque Ti beyond the required value Tidem, to raise the AT input speed Ni toward the post-shifting synchronization speed Nisyca, and bringing the engaging-side coupling device CB in the form of the brake B2 into its engaged state when the AT input speed Ni has been raised to a predetermined value. This predetermined value is a predetermined threshold value of the AT input speed Ni which is considered to be high enough to reduce a synchronizing shock of the engaging-side coupling device CB (brake B2) due to its abrupt or rapid engaging action. The threshold value may be equal to the post-shifting synchronization speed Nisyca, or a value which is lower than and close to the post-shifting synchronization speed Nisyca. In the present embodiment, the control implemented by the step-variable shifting control portion 82 to temporarily increase the AT input torque Ti in the process of the coasting shift-down action of the step-variable transmission portion 20 will be referred to as a "temporary torque increasing control".

To temporarily increase the AT input torque Ti beyond the required value Tidem, the step-variable shifting control portion 82 applies a torque increasing command to the hybrid control portion 84, to temporarily increase the output torque of the drive power source beyond a required value. To temporarily increase the output torque of the drive power source beyond the required value in the non-operated state of the accelerator pedal, it is desirable to temporarily increase the MG2 torque Tm beyond a required value, in view of higher degrees of controllability and response of the MG2 torque Tm than the engine torque Te. Accordingly, the step-variable shifting control portion 82 applies the torque increasing command to the hybrid control portion 84, to temporarily increase the MG2 torque Tm beyond the required value, for thereby temporarily increasing the AT input torque Ti beyond the required value Tidem. The above-indicated value of the MG2 torque Tm is a value required to establish the operator-required vehicle drive torque Tdem of the drive power source (second motor/generator MG2 and engine 14).

The temporary torque increasing control implemented by the step-variable shifting control portion 82 in the process of the coasting shift-down action (2→1) would possibly cause generation of a synchronizing shock of the step-variable transmission portion 20 upon full engagement of the one-way clutch F1 when the AT input speed Ni has been raised to the post-shifting synchronization speed Nisyca in the first speed AT gear position, before full engagement of the brake B2 disposed parallel with the one-way clutch F1. To reduce this synchronizing shock, the step-variable shifting control portion 82 implements the temporary torque increasing control in the process of the coasting shift-down action (2→1), so as to reduce the temporarily increased AT input torque Ti when the AT input speed Ni has been raised to a second predetermined value lower than the above-indicated predetermined value (threshold value). The step-variable shifting control portion 82 commands the hybrid control portion 84 to reduce the output torque of the drive power source, for reducing the AT input torque Ti to or below a predetermined upper limit at or below which the synchronizing shock can be reduced. In the present embodiment, this control to reduce the AT input torque Ti before the rise of the AT input speed Ni to the post-shifting synchronization speed Nisyca in the process of the temporary torque increasing control will be referred to as a "pre-synchronization torque reducing control". For example, the above-indicated second predetermined value of the AT input speed Ni is determined to be lower than the post-shifting synchronization speed Nisyca by a predetermined amount, but to be close to the post-shifting synchronization speed Nisyca, so that the AT input speed Ni can be considered to have been raised to a value at which it is desirable to reduce a rate of increase of the AT input speed Ni. In this respect, it is possible to determine that the AT input speed Ni has been raised to the above-indicated second predetermined value, when a predetermined length of time has passed after a moment of generation of the command to implement the coasting shift-down action (2→1).

The step-variable shifting control portion 82 terminates the temporary torque increasing control if the AT input speed Ni has been raised to the post-shifting synchronization speed Nisyca in an inertia phase of the coasting shift-down action (2→1) of the step-variable transmission portion 20. The AT input torque Ti may deviate from the required value Tidem, at a moment of termination of the temporary torque increasing control by the step-variable shifting control portion 82, namely, at a moment of termination of the pre-synchronization torque reducing control in the process of the temporary torque increasing control. The AT input torque Ti which has once deviated from the required value Tidem is restored to the required value Tidem when the AT input speed Ni has been raised to the post-shifting synchronization speed Nisyca. To restore the AT input torque Ti back to the required value Tidem, the step-variable shifting control portion 82 commands the hybrid control portion 84 to gradually increase the AT input torque Ti toward the required value Tidem at a predetermined rate. For example, this rate of increase of the AT input torque Ti is determined so as to rapidly restore the AT input torque Ti within a predetermined length of time while reducing the synchronizing shock due to excessively rapid restoration of the AT input torque Ti. The predetermined length of time is a predetermined permissible maximum length of time required to restore the AT input torque Ti to the required value Tidem.

Figure 7:
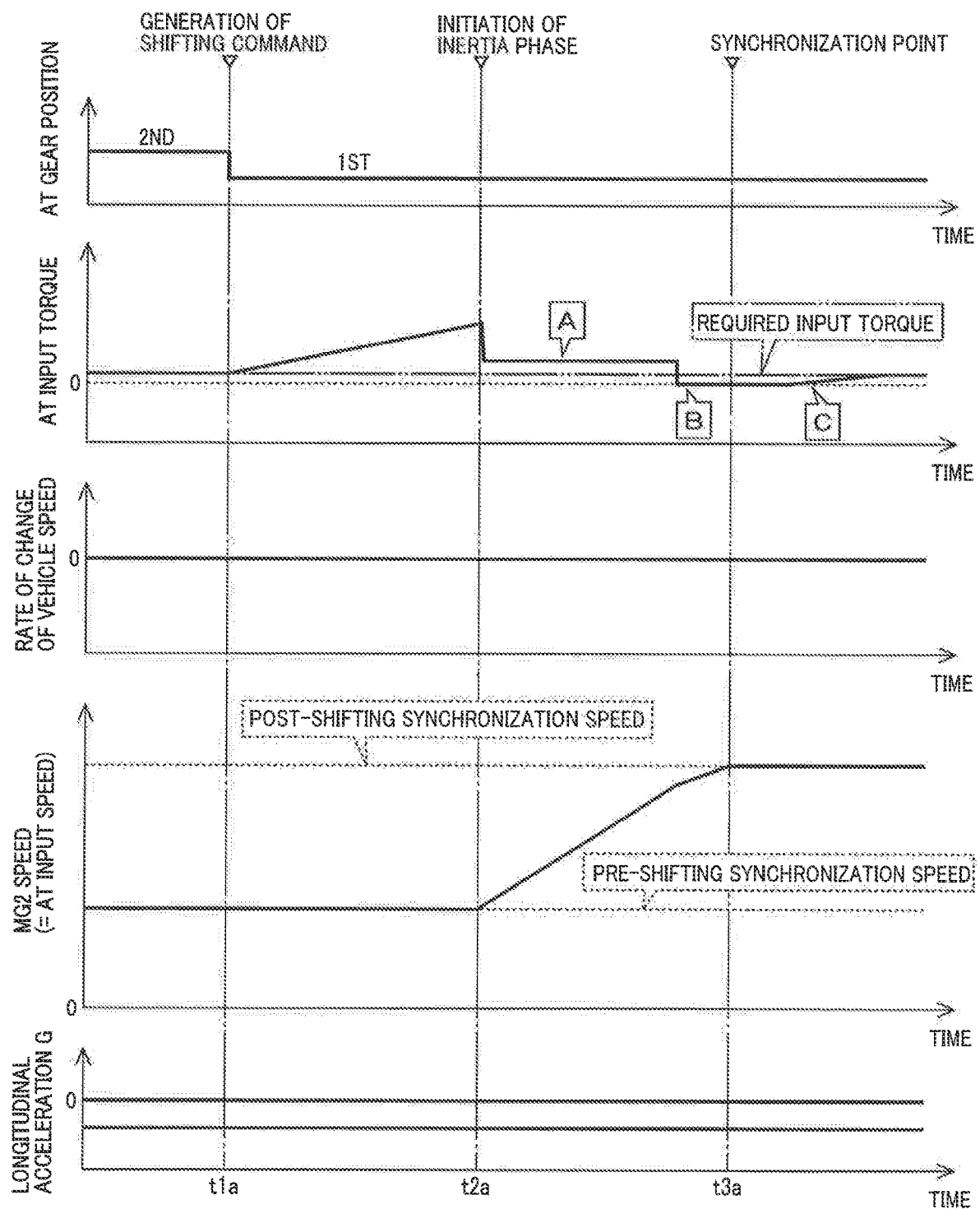
FIG. 7 is a time chart illustrating an example of changes of various parameters when an input torque of the step-variable transmission portion is temporarily increased in the process of its coasting shift-down action from the second speed AT gear position to the first speed AT gear position.

FIG. 7 is the time chart illustrating an example of changes of various parameters in the temporary torque increasing control in the process of the coasting shift-down action (2→1) of the step-variable transmission portion 20. In this specific example of FIG. 7, the vehicle 10 is running on a flat or slight downhill roadway, in the non-operated state of the brake pedal, and in a slightly decelerating state with a rate dNo/dt of change of the running speed V being close to zero, or in a constant-speed running state with the rate dNo/dt of change being zero. In FIG. 7, the hydraulic control command signals Sat to implement the coasting shift-down action (2→1) of the step-variable transmission portion 20 are generated at a point of time t1a. Upon generation of the hydraulic control command signals Sat, the temporary torque increasing control to temporarily increase the AT input torque Ti beyond the required value Tidem is initiated while both of the releasing-side and engaging-side coupling devices CB are placed in free states without generation of the engaging torques Tcb. The temporary torque increasing control causes initiation of a rise of the AT input speed Ni toward the post-shifting synchronization speed Nisyca, and initiation of the inertia phase of the coasting shift-down action at a point of time t2a. In the inertia phase indicated by "A" in FIG. 7, the coasting shift-down action progresses with the rise of the AT input speed Ni toward the post-shifting synchronization speed Nisyca. In the process of the temporary torque increasing control, the pre-synchronization torque reducing control (indicated by "B" in FIG. 7) is implemented to reduce the AT input torque Ti before the rise of the AT input speed Ni to the post-shifting synchronization speed Nisyca, so that the coasting shift-down action progresses moderately, with a reduced risk of generation of the synchronizing shock. When the AT input speed Ni has been raised to the post-shifting synchronization speed Nisyca at a point of time t3a, the temporary torque increasing control is terminated. After this point of time t3a, the AT input torque Ti which has once deviated from the required value Tidem is gradually increased toward the required value Tidem, as indicated by "C" in FIG. 7.

The change rate dNo/dt of the vehicle running speed V is a rate at which the vehicle running speed V changes, that is, a derivative of the vehicle running speed V. In the present embodiment, the change rate dNo/dt is represented by a rate of change of the output speed No of the step-variable transmission portion 20, which corresponds to the vehicle running speed V. That is, the change rate dNo/dt is represented by a derivative of the output speed No. While the vehicle 10 is running with its running speed V being kept constant, the change rate dNo/dt is zero. It is noted that the change rate dNo/dt has a positive value during acceleration of the vehicle 10 with its running speed V being raised, while the change rate dNo/dt has a negative value in a decelerating state of the vehicle 10 with its running speed V being lowered. Accordingly, in the decelerating state of the vehicle 10, the change rate dNo/dt has a larger absolute value when the change rate dNo/dt is relatively low than when the change rate dNo/dt is relatively high. That is, the deceleration value of the vehicle 10 is higher when the change rate dNo/dt is relatively low than when it is relatively high.

By the way, the temporary torque increasing control implemented by the step-variable shifting control portion 82 is a feed-forward control in which an amount ΔTi of increase of the AT input torque Ti from the required value Tidem in the process of the coasting shift-down action of the step-variable transmission portion 20 is given as a feed-forward control value. It is also noted that when the change rate dNo/dt is relatively low with a relatively high value of deceleration of the vehicle 10, as in the operated state of the brake pedal, in the process of the coasting shift-down action of the step-variable transmission portion 20, the post-shifting synchronization speed Nisyca is lower than in the non-operated state of the brake pedal, so that the AT input speed Ni is raised to the post-shifting synchronization speed Nisyca in a relatively short length of time. On the other hand, when the change rate dNo/dt is relatively high during acceleration of the vehicle 10 with a rise of the running speed V on a steep downhill roadway, for instance, in the process of the coasting shift-down action of the step-variable transmission portion 20, the post-shifting synchronization speed Nisyca is relatively high, so that it takes a relatively long time for the AT input speed Ni to reach the post-shifting synchronization speed Nisyca, that is, there is a risk of a slow progress of the coasting shift-down action. Accordingly, if the AT input speed Ni is raised with the constant increase amount ΔTi being given as the feed-forward control value irrespective of the change rate dNo/dt of the vehicle running speed V in the process of the coasting shift-down action of the step-variable transmission portion 20, there is the risk of the slow progress of the coasting shift-down action where the change rate dNo/dt of the vehicle running speed V is relatively high, or a risk of excessively rapid rise of the AT input speed Ni toward the post-shifting synchronization speed Nisyca, resulting in a risk of increase of the synchronizing shock of the step-variable transmission portion 20 where the change rate dNo/dt of the vehicle running speed V is relatively low. The synchronizing shock is likely to take place upon full engagement of the one-way clutch F1 in the process of the coasting shift-down action (2→1), in particular, when the change rate dNo/dt is low. It is desirable to reduce the synchronizing shock of the step-variable transmission portion 20 in the process of its coasting shift-down action when the change rate dNo/dt is low, while preventing the slow progress of the coasting shift-down action.

The electronic control device 80 further includes a vehicle state determining means in the form of a vehicle state determining portion 86, and a torque increasing amount setting means in the form of a torque increasing amount setting portion 88, for the purpose of performing its function to reduce the synchronizing shock of the step-variable transmission portion 20 in the process of its coasting shift-down action while preventing a slow progress of the coasting shift-down action.

The vehicle state determining portion 86 is configured to determine, on the basis of the hydraulic control command signals Sat, whether the step-variable transmission portion 20 is in the process of the coasting shift-down action. The vehicle state determining portion 80 is also configured to determine, on the basis of the torque increasing command generated from the step-variable shifting control portion 82, whether the step-variable shifting control portion 82 is in the process of the temporary torque increasing control. The vehicle state determining portion 86 is further configured to calculate the change rate dNo/dt of the vehicle running speed V, on the basis of the output speed No detected by the output speed sensor 66. The vehicle state determining portion 86 is also configured to determine whether the vehicle running speed V is changing, when the vehicle state determining portion 86 has determined that the step-variable transmission portion 20 is in the process of the coasting shift-down action and that the step-variable shifting control portion 82 is in the process of the temporary torque increasing control. This determination regarding the running speed V is made by determining whether an absolute value of the change rate dNo/dt is larger than a predetermined value. Namely, the vehicle state determining portion 86 determines whether the vehicle running speed V is not held constant or substantially constant, that is, the change rate dNo/dt is not zero or substantially zero, namely, determines whether the vehicle 10 is in a slightly accelerating or decelerating state with a slight change of the running speed V. The above-indicated predetermined absolute value of the change rate dNo/dt is a threshold value above which the AT input torque Ti is required to be compensated in the process of the temporary torque increasing control when the change rate dNo/dt is zero, that is, required to be compensated according to the change rate dNo/dt the process of the temporary torque increasing control. It is noted that the absolute value of the change rate dNo/dt increases with a decrease of the change rate dNo/dt in the decelerating state of the vehicle 10.

The torque increasing amount setting portion 88 is configured to set the increase amount ΔTi of the AT input torque Ti in the temporary torque increasing control, when the vehicle state determining portion 86 has determined that the step-variable transmission portion 20 is in the process of the coasting shift-down action.

Described more specifically, the torque increasing amount setting portion 88 sets a basic amount ΔTib of the increase amount ΔTi in the process of the temporary torque increasing control implemented when the change rate dNo/dt of the vehicle running speed V is zero. The basic amount ΔTib is determined depending upon the relevant one of the coasting shift-down actions of the step-variable transmission portion 20, and a difference between the post-shifting synchronization speed Nisyca and the pre-shifting synchronization speed Nisycb, so that the AT input speed Ni changes toward the post-shifting synchronization speed Nisyca in an adequate manner in the inertia phase of the coasting shift-down action, namely, so as to ensure a good balance between reduction of the shifting shock of the step-variable transmission portion 20 and reduction of the required time of the coasting shift-down action.

When the vehicle state determining portion 86 determines that the vehicle running speed V is not changing, the torque increasing amount setting portion 88 sets the basic amount ΔTib as the increase amount ΔTi in the process of the temporary torque increasing control. Accordingly, when the absolute value of the change rate dNo/dt is smaller than the predetermined value, the AT input torque Ti in the process of the temporary torque increasing control implemented when the change rate dNo/dt is zero is not compensated (AT input torque Ti (=required input torque value Tidem+basic amount ΔTib)).

When the vehicle state determining portion 86 has determined that the vehicle running speed V is changing, on the other hand, the torque increasing amount setting portion 88 sets the increase amount ΔTi by compensating the basic amount ΔTib according to the change rate dNo/dt. Accordingly, when the absolute value of the change rate dNo/dt is equal to or larger than the predetermined value, the AT input torque Ti in the process of the temporary torque increasing control implemented when the change rate dNo/dt is zero is compensated according to the change rate dNo/dt to set the increase amount ΔTi.

When the vehicle 10 is in a decelerating state with a relatively low value of the change rate dNo/dt, for instance, the torque increasing amount setting portion 88 sets the increase amount ΔTi by compensating the basic amount ΔTib in the inertia phase such that the basic amount ΔTib is reduced. Accordingly, in the decelerating state of the vehicle 10, the AT input torque Ti in the inertia phase in the temporary torque increasing control implemented when the change rate dNo/dt is zero is compensated so as to be reduced. When the vehicle 10 is in an accelerating state with a relatively high value of the change rate dNo/dt, on the other hand, the torque increasing amount setting portion 88 sets the increase amount ΔTi by compensating the basic amount ΔTib in the inertia phase such that the basic amount ΔTib is increased. Accordingly, in the accelerating state of the vehicle 10, the AT input torque Ti in the inertia phase in the temporary torque increasing control implemented when the change rate dNo/dt is zero is compensated so as to be increased. Thus, the torque increasing amount setting portion 88 sets the torque increase amount ΔTi in the temporary torque increasing control in the process of the coasting shift-down action such that the torque increase amount ΔTi is smaller when the change rate dNo/dt of the vehicle running speed V is relatively low than when the change rate dNo/dt is relatively high. It is noted that while the basic increase amount ΔTib may be compensated by one of two predetermined amounts which is selected depending upon whether the vehicle 10 is in a decelerating state or in an accelerating state, an amount of compensation of the basic increase amount ΔTib may be increased with an increase of the absolute value of the change rate dNo/dt.

The upper limit of the AT input torque Ti used in the pre-synchronization torque reducing control in the temporary torque increasing control implemented by the step-variable shifting control portion 82 is also preferably compensated according to the change rate dNo/dt, like the basic amount ΔTib. Namely, the torque increasing amount setting portion 88 is preferably configured to set the upper limit of the AT input torque Ti in the pre-synchronization torque reducing control such that the upper limit is lower when the change rate dNo/dt is relatively low than when the change rate dNo/dt is relatively high. It is noted that while the upper limit of the AT input torque Ti may be compensated by one of three predetermined amounts which is selected depending upon whether the change rate dNo/dt is zero, and whether the vehicle 10 is in a decelerating state or in an accelerating state, an amount of compensation of the upper limit may be reduced with a decrease of the change rate dNo/dt.

At the vehicle running speed V lower than a lower limit below which the output speed No cannot be accurately detected, the change rate dNo/dt may not be accurately calculated. To set the basic amount ΔTib, it is desirable to reduce an influence of an inaccurately calculated value of the change rate dNo/dt on the basic amount ΔTib. Accordingly, the torque increasing amount setting portion 88 is configured to set the basic amount ΔTib such that the basic amount ΔTib decreases with a decrease of the vehicle running speed V.

The viscosity of the working fluid within the step-variable transmission portion 20 increases with a decrease of the temperature THoil of the working fluid, so that a resistance of the working fluid to rotary motions of the rotary members in the step-variable transmission portion 20 increases with the decrease of the temperature THoil. For instance, a negative torque acting on the intermediate power transmitting member 30 increases with an increase of the viscosity, so that difficulty of the intermediate power transmitting member 30 to raise the AT input speed Ni increases with the decrease of the viscosity. Accordingly, the torque increasing amount setting portion 88 is configured to set the basic amount ΔTib such that the basic amount ΔTib increases with the decrease of the temperature THoil.

Figure 8:
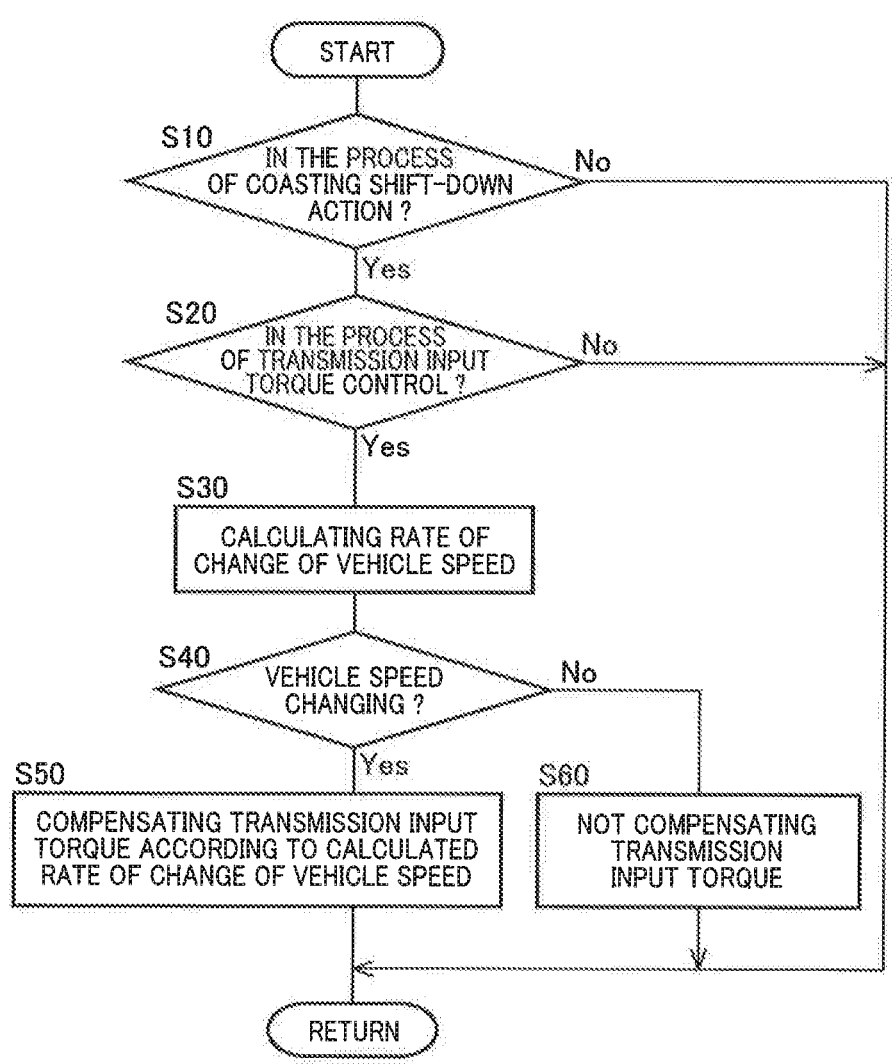
FIG. 8 is a flow chart illustrating a major control operation of an electronic control device provided to control the vehicle, namely, a control routine executed to reduce a synchronizing shock of the step-variable transmission portion when a rate of change of the running speed of vehicle is relatively low, while preventing a slow progress of the coasting shift-down action of the step-variable transmission portion.
Figure 9:
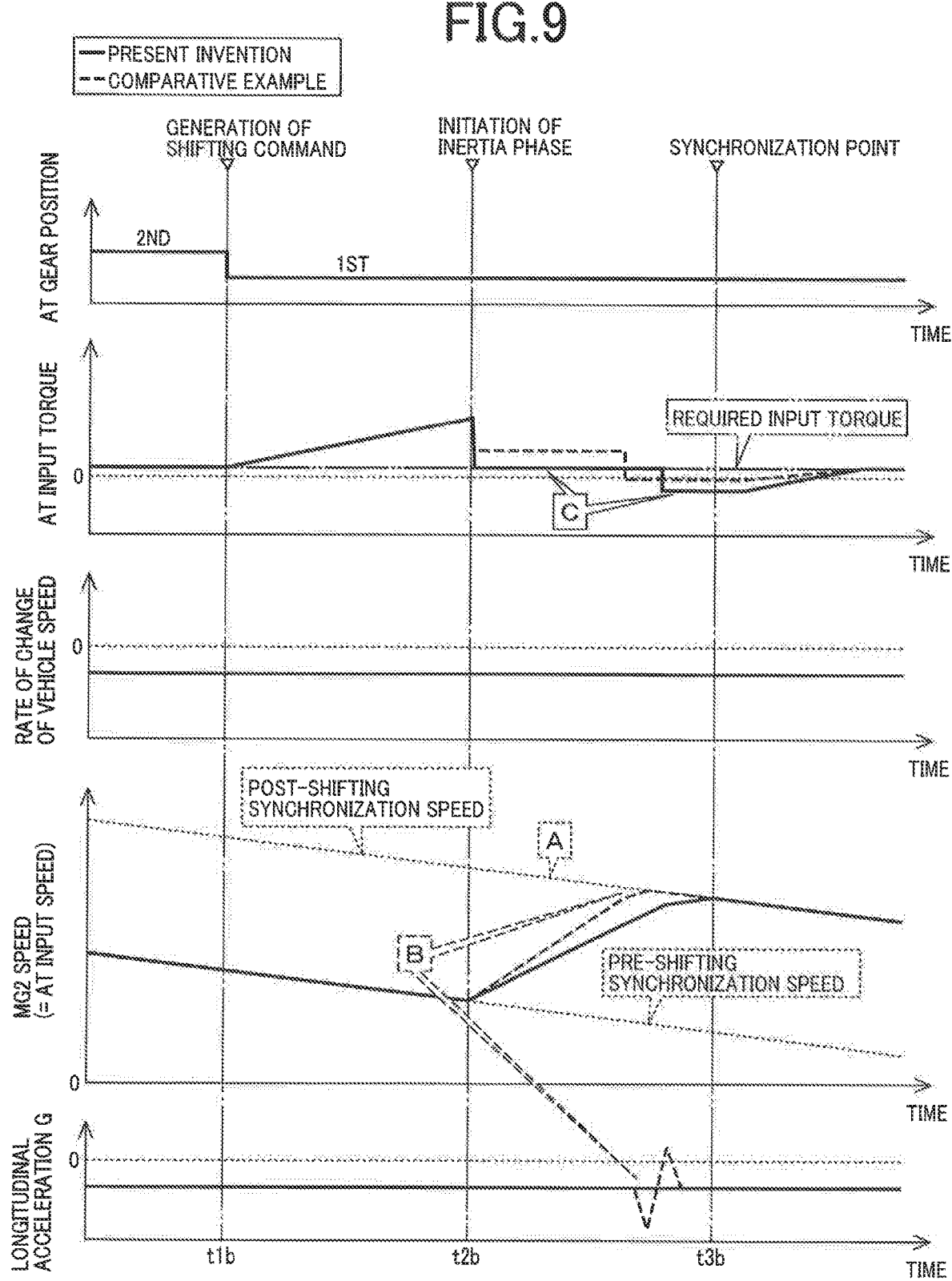
FIG. 9 is a time chart illustrating an example of changes of the various parameters when the control routine illustrated in the flow chart of FIG. 8 is executed.

FIG. 8 is the flow chart illustrating a major control operation of the electronic control device 80, namely, a control routine executed to reduce a synchronizing shock of the step-variable transmission portion 20 when the change rate dNo/dt of the running speed V of vehicle 10 is relatively low, while preventing a slow progress of the coasting shift-down action of the step-variable transmission portion 20. For example, this control routine is repeatedly executed during running of the vehicle 10. FIG. 9 is the time chart illustrating an example of changes of various parameters of the vehicular drive system 12 when the control routine illustrated in the flow chart of FIG. 8 is executed.

The control routine of FIG. 8 is initiated with a step S10 corresponding to the function of the vehicle state determining portion 86, to determine whether the step-variable transmission portion 20 is in the process of a coasting shift-down action. When a negative determination is obtained in the step S10, one cycle of execution of the control routine is terminated. When an affirmative determination is obtained in the step S10, the control flow goes to a step S20 also corresponding to the function of the vehicle state determining portion 86, to determine whether the step-variable shifting control portion 82 is in the process of the temporary torque increasing control to temporarily increase the AT input torque Ti. When a negative determination is obtained in the step S20, one cycle of execution of the control routine is terminated. When an affirmative determination is obtained in the step S20, the control flow goes to a step S30 also corresponding to the function of the vehicle state determining portion 86, to calculate the change rate dNo/dt of the vehicle running speed V. Then, the control flow goes to a step S40 also corresponding to the function of the vehicle state determining portion 86, to determine whether the vehicle running speed V is changing. For example, this determination is made depending upon whether the absolute value of the change rate dNo/dt is larger than a predetermined value. When an affirmative determination is obtained in the step S40, the control flow goes to a step S50 corresponding to the function of the torque increasing amount setting portion 88, to set the increase amount ΔTi. In the step S50, the increase amount ΔTi when the absolute value of the change rate dNo/dt is relatively large is set by compensating the basic amount ΔTib used when the change rate dNo/dt is zero. The compensation of this basic amount ΔTib is made according to the change rate dNo/dt. Thus, when the absolute value of the change rate dNo/dt is relatively large, the AT input torque Ti used in the temporary torque increasing control when the change rate dNo/dt is zero is compensated according to the change rate dNo/dt. When the vehicle 10 is in a decelerating state, for instance, the basic amount ΔTib in the inertia phase is compensated so as to be reduced so that the AT input torque Ti is reduced. When the vehicle 10 is in an accelerating state, on the other hand, the basic amount ΔTib in the inertia phase is compensated so as to be increased so that the AT input torque Ti is increased. When a negative determination is obtained in the step S40, the control flow goes to a step S60 also corresponding to the function of the torque increasing amount setting portion 88, to set the increase amount ΔTi. In the step S60, the basic amount ΔTib is set as the increase amount ΔTi when the absolute value of the change rate dNo/dt is relatively small. Thus, when the change rate dNo/dt is relatively small, the AT input torque Ti used when the change rate dNo/dt is zero is not compensated.

FIG. 9 is the time chart illustrating an example of changes of the various parameters when the temporary torque increasing control is implemented in the process of the coasting shift-down action (2→1) of the step-variable transmission portion 20. In the specific example of FIG. 9, the vehicle 10 is running on a flat roadway in an operated state of the brake pedal, at a larger value of deceleration than in the example of FIG. 7. In FIG. 9, "t1b" represents a moment of generation of the hydraulic control command signals Sat to implement the coasting shift-down action (2→1) of the step-variable transmission portion 20. Upon generation of the hydraulic control command signals Sat, the temporary torque increasing control is initiated while the releasing-side and engaging-side coupling devices CB are placed in free states. The inertia phase of the coasting shift-down action is initiated at a point of time t2b when a rise of the AT input speed Ni toward the post-shifting synchronization speed Nisyca is initiated according to the temporary torque increasing control. In the inertia phase, the coasting shift-down action progresses with the rise of the AT input speed Ni toward the post-shifting synchronization speed Nisyca according to the temporary torque increasing control. When the vehicle 10 is in a decelerating state at a relatively large deceleration value, namely, with a relatively large absolute value of the change rate dNo/dt, an amount of decrease of the post-shifting synchronization speed Nisyca is also relatively large, as indicated by "A" in FIG. 9. In a comparative example indicated by broken lines, the basic amount ΔTib of the increase amount ΔTi in the inertia phase is not compensated according to the temporary torque increasing control, and the AT input torque Ti is the same as in a decelerating state of the vehicle 10 at a relatively small deceleration value. Accordingly, the AT input speed Ni is rapidly raised toward the post-shifting synchronization speed Nisyca, so that the step-variable transmission portion 20 suffers from a synchronizing shock upon full engagement of the one-way clutch F1, as indicated by "B" in FIG. 9. In the present embodiment indicated by solid lines, the basic amount ΔTib in the inertia phase is compensated so as to be reduced, in the deceleration state of the vehicle 10 at the relatively large deceleration value, so that the AT input torque Ti is compensated so as to be reduced, as indicated by "C" in FIG. 9. Accordingly, the AT input speed Ni is gradually raised so that the synchronizing shock is reduced. When the AT input speed Ni has been raised to the post-shifting synchronization speed Nisyca at a point of time t3b, the temporary torque increasing control is terminated. After the AT input speed Ni has been raised to the post-shifting synchronization speed Nisyca, the AT input torque Ti is gradually increased toward the required value Tidem.

As described above, the control apparatus in the form of the electronic control device 80 according to the present invention is configured to set the increase amount ΔTi of the input torque Ti of the step-variable transmission portion 20 beyond the required value Tidem in the process of its coasting shift-down action, such that the increase amount ΔTi is smaller when the change rate dNo/dt of the vehicle running speed V is relatively low than when the rate of change dNo/dt is relatively high. When the change rate dNo/dt is relatively high, for instance, when the acceleration value of the vehicle 10 is relatively large, the torque increasing amount setting portion 88 sets a comparatively large amount ΔTi of increase of the input torque Ti, so that the input speed Ni can be raised to the post-shifting synchronization speed Nisyca in a relatively short length of time. When the change rate dNo/dt of the vehicle running speed V is relatively low, for instance, when the deceleration value of the vehicle 10 is relatively large, the torque increasing amount setting portion 88 sets a comparatively small amount ΔTi of increase of the input torque so that it is possible to reduce a risk of an excessively rapid rise of the input speed Ni to the post-shifting synchronization speed Nisyca. Thus, the present electronic control device 80 permits reduction of a synchronizing shock of the step-variable transmission portion 20 in the process of its coasting shift-down action when the change rate dNo/dt of the running speed V of the vehicle 10 is relatively low, while preventing a slow progress of the coasting shift-down action.

The present electronic control device 80 is further configured to set the increase amount ΔTi of the input torque Ti so as to be comparatively small, when the change rate dNo/dt of the vehicle running speed V is relatively low in the process of the coasting shift-down action (2→1) of the step-variable transmission portion 20. Accordingly, the present electronic control device 80 reduces a risk of excessively rapid rise of the input speed Ni toward the post-shifting synchronization speed Nisyca and a consequent risk of generation of the synchronizing shock upon full engagement of the one-way clutch F1.

The present electronic control device 80 is also configured such that the AT input torque Ti which has been temporarily increased is reduced when the AT input speed Ni has been raised to the above-described second predetermined value in the process of the coasting shift-down action. Accordingly, the rate of rise of the AT input speed Ni is made lower than where the AT input torque Ti is kept at the temporarily increased value, so that the risk of generation of the synchronizing shock can be reduced. In addition, the upper limit of the AT input torque to or below which the AT input torque is reduced is set such that the upper limit is smaller when the change rate dNo/dt is relatively low than when the change rate dNo/dt is relatively high. Accordingly, the risk of generation of the synchronizing shock can be adequately reduced.

The electronic control apparatus 80 is further configured such that the basic amount ΔTib of the increase amount ΔTi of the input torque Ti is set such that the basic amount ΔTib decreases with the decrease of the vehicle running speed V. Accordingly, the basic amount ΔTib is set to be small when the vehicle running speed V is extremely low, so that the increase amount ΔTi is less likely to be influenced by inaccurate calculation of the change rate dNo/dt of the vehicle running speed V.

In addition, the electronic control apparatus 80 is configured such that the basic amount ΔTib is set such that the basic amount ΔTib increases with a decrease of the temperature THoil of the working fluid. Accordingly, the AT input speed Ni can be relatively easily raised irrespective of the resistance of the working fluid to the rotary motions of the rotary members in the step-variable transmission portion 20.

Further, the electronic control apparatus 80 is configured to temporarily increase the AT input torque Ti beyond the required value Tidem, by temporarily increasing the output torque Tm of the second motor/generator MG2 beyond the required value. Accordingly, the AT input torque Ti can be adequately increased by controlling the output torque Tm of the second motor/generator MG2, which can be more easily controlled with a higher degree of control response, than the output torque Te of the engine 14.

While the preferred embodiment of this invention has been described in detail by reference to the drawings, it is to be understood that the present invention may be otherwise embodied.

The coasting shift-down action of the step-variable transmission portion 20 from the second speed AT gear position to the first speed AT gear position (2→1) has been described as an example of a coasting shift-down action in the illustrated embodiment. However, the principle of this invention is also applicable to coasting shift-down actions of the step-variable transmission portion 20 other than the shift-down action from the second speed AT gear position to the first speed AT gear position. Namely, the step-variable transmission portion 20 has a risk of generation of a coasting shift-down shock other than a synchronizing shock due to the engaging action of the one-way clutch F1. For example, the step-variable transmission portion 20 may suffer from a shock upon an engaging action of one of the coupling devices CB in an overshooting state of the AT input speed Ni exceeding the post-shifting synchronization speed Nisyca. Thus, the present invention is applicable to a coasting shift-down action of the step-variable transmission portion 20 to the AT gear position which is not established with the engaging action of the one-way clutch F1. Accordingly, the present invention is applicable to a step-variable transmission portion not provided with the one-way clutch F1.

In the illustrated embodiment, the coasting shift-down action of the step-variable transmission portion 20 is controlled with a temporary increase of its input torque Ti while both of the releasing-side and engaging-side coupling devices CB are placed in free states without generation of the engaging torques Tcb. However, the coasting shift-down action of the step-variable transmission portion 20 may be implemented otherwise, as long as the input torque Ti is temporarily increased in the process of the coasting shift-down action. Accordingly, the coasting shift-down action may be implemented even while the coupling device CB to be brought into its engaged state to implement the coasting shift-down action has a certain value of the engaging torque Tcb not large enough to permit this coupling device CB to be fully engaged.

Further, the principle of the present invention applies to the coasting shift-down action of the step-variable transmission portion 20 to the first speed AT gear position which is established with the engaging action of the one-way clutch F1. However, the principle of the invention is equally applicable to any coasting shift-down action of a step-variable transmission to its AT gear position which is established with the engaging action of a one-way clutch.

The illustrated embodiment is also configured such that the amount of increase ΔTi of the input torque Ti of the step-variable transmission portion 20 in the process of its coasting shift-down action is smaller when the change rate dNo/dt of the vehicle running speed V is relatively low than when the change rate is relatively high. In this respect, it is noted that the deceleration value of the vehicle 10 increases, that is, the change rate dNo/dt of the vehicle running speed decreases, with an increase of the amount Bra of operation of the brake pedal by the vehicle operator. Accordingly, the amount of increase ΔTi of the input torque Ti in the process of the coasting shift-down action may be decreased with the increase of the operation amount Bra of the brake pedal.

The illustrated embodiment is further configured to calculate the change rate dNo/dt of the vehicle running speed V on the basis of the output speed No detected by the output speed sensor 66. However, the change rate dNo/dt of the vehicle running speed V may be calculated on the basis of the detected vehicle running speed V. Alternatively, the change rate dNo/dt may be calculated on the basis of the longitudinal acceleration value G detected by the G sensor 74. Further alternatively, the change rate dNo/dt may be estimated on the basis of the amount Bra of operation of the brake pedal by the vehicle operator. Alternatively, the change rate dNo/dt may be estimated on the basis of road gradient information of a map data stored in a memory, or road gradient information available from big data obtained through network communication systems. Further, the change rate dNo/dt may be obtained from a combination of two or more of the sources described above.

In the illustrated embodiment, the vehicle 10 is provided with the transmission device 40. However, the control apparatus according to the present invention is equally applicable to a hybrid vehicle of a parallel type which is provided with an engine, a motor/generator operatively connected to the drive wheels in a power transmittable manner, and a step-variable transmission constituting a part of a power transmitting path between the engine and drive wheels. Further, the control apparatus according to the present invention is applicable to a hybrid vehicle of a series type which is provided with: an engine; an electricity generating motor/generator operated with a drive force of the engine; a vehicle driving motor/generator operated an electric power generated by the electricity generating motor/generator and/or an electric power supplied from a battery; and a step-variable transmission constituting a part of a power transmitting path between the vehicle driving motor/generator and drive wheels. Further, the present control apparatus is applicable to a vehicle provided with an engine functioning as a vehicle drive power source, and a step-variable transmission constituting a part of a power transmitting path between the engine and drive wheels. Further, the present control apparatus is applicable to a vehicle provided with a motor/generator functioning as a vehicle drive power source, and a step-variable transmission constituting a part of a power transmitting path between the motor/generator and drive wheels. In essence, the present control apparatus is applicable to a vehicle provided with a vehicle drive power source, and a step-variable transmission constituting a part of a power transmitting path between the vehicle drive power source and drive wheels.

In the illustrated embodiment, the vehicle 10 is provided with the electrically controlled transmission mechanism in the form of the continuously-variable transmission portion 18 having the differential mechanism 32 which is the planetary gear set of the single-pinion type. However, the continuously-variable, transmission portion 18 may be replaced by a transmission mechanism a differential function of which is limited by controlling a clutch or brake connected to a rotary member of the differential mechanism 32. Further, the differential mechanism 32 may be a differential mechanism which consists of a plurality of planetary gear sets connected to each other and which has four or more rotary elements. Alternatively, the differential mechanism 32 may be replaced by a differential gear device which has a pinion rotated by the engine 14 and a pair of bevel gears meshing with the pinion, and wherein the first motor/generator MG1 and the intermediate power transmitting member 30 are respectively connected to the pinion and the bevel gears. Further alternatively, the differential mechanism 32 may be replaced by a mechanism consisting of two or more planetary gear sets having rotary elements which are connected to each other and which are respectively operatively connected to the engine, motor/generator and vehicle drive wheels in a power transmittable manner.

In the illustrated embodiment, the step-variable transmission portion 20 of the planetary gear type is provided as the step-variable transmission constituting a part of the power transmitting path between the drive power source and the drive wheels. However, the step-variable transmission portion 20 may be replaced by any other type of step-variable transmission such as a known DCT (dual clutch transmission) which is a synchronous-meshing parallel two-axes type automatic transmission having two input shafts which are connected to respective coupling devices (clutches) for establishing respective even-number and odd-number gear positions. In the DCT, one of a plurality of coupling devices or a coupling device to be controlled for a shifting action of the DCT corresponds to the coupling device connected to each of the two input shafts.

In the illustrated embodiment, the ten overall speed positions are selectively established for the four AT gear positions. However, the numbers of the overall speed positions and the AT gear positions are not limited to those of the illustrated embodiment. The number of the overall speed positions is preferably equal to or larger than that of the AT gear positions, more preferably larger than that of the AT gear positions. For example, the number of the overall speed positions is desirably twice the number of the AT gear positions, or more. The step-variable transmission portion 20 is shifted from one of the AT gear positions to another, so that the rotating speed of the intermediate power transmitting member 30 and the operating speed of the second motor/generator MG2 connected to the intermediate power transmitting member 30 are held within predetermined ranges. On the other hand, the transmission device 40 is shifted from one of the overall speed positions to another, so that the engine speed Ne is held within a predetermined range. In view of the above, the numbers of the AT gear positions and the overall speed positions are suitably determined.

While the preferred embodiment and its modifications have been described above for illustrative purpose only, it is to be understood that the present invention may be embodied with various other changes and modifications not described herein, which may occur to those skilled in the art.

NOMENCLATURE OF ELEMENTS

10: vehicle (hybrid vehicle)
14: engine (drive power source)
18: electrically controlled continuously-variable transmission portion (electrically controlled transmission mechanism)
20: mechanically operated step-variable transmission portion (step-variable transmission)
28: drive wheels
30: intermediate power transmitting member (output rotary member of electrically operated transmission mechanism)
32: differential mechanism
80: electronic control device (control apparatus)
82: step-variable shifting control portion (shift control portion)
88: torque increasing amount setting portion
CB: coupling devices
F1: one-way clutch
MG1: first motor/generator
MG2: second motor/generator (drive power source)

What is claimed is:

1. A control apparatus for a vehicle provided with a drive power source, drive wheels, and a step-variable transmission which constitutes a part of a power transmitting path between the drive power source and the drive wheels and which has a plurality of coupling devices which are selectively engaged to establish a selected one of a plurality of gear positions, the control apparatus comprising:
a shift control portion configured to temporarily increase an input torque of the step-variable transmission beyond a required value, in the process of a coasting shift-down action of the step-variable transmission, to thereby raise an input speed of the step-variable transmission toward a synchronization value in the gear position to be established after the coasting shift-down action, the shift control portion commanding an engaging-side coupling device which is the coupling device placed in a released state before the coasting shift-down action, to be brought into an engaged state, when the input speed has been raised to a predetermined value; and
a torque increasing amount setting portion configured to set an amount of increase of the input torque of the step-variable transmission beyond the required value in the process of the coasting shift-down action, such that the amount of increase is smaller when a rate of change of a running speed of the vehicle is relatively low than when the rate of change is relatively high, the rate of change of the running speed having a negative value in a decelerating state of the vehicle, wherein the shift control portion reduces the temporarily increased input torque of the step-variable transmission when the input speed of the step-variable transmission has been raised to a second predetermined value lower than said predetermined value, in the process of the coasting shift-down action.

2. The control apparatus according to claim 1, wherein the coasting shift-down action of the step-variable transmission is a shift-down action to said selected one gear position, which is established by an engaging action of the engaging-side coupling device and established by an engaging action of a one-way clutch disposed parallel with the engaging-side coupling device.

3. The control apparatus according to claim 1, wherein the torque increasing amount setting portion sets an upper limit of the input torque to or below which the input torque is reduced, such that the upper limit is smaller when the rate of change of the running speed is relatively low than when the rate of change is relatively high.

4. The control apparatus according to claim 1, wherein the torque increasing amount setting portion sets the amount of increase of the input torque of the step-variable transmission such that the amount of increase decreases with a decrease of the running speed of the vehicle.

5. The control apparatus according to claim 1, wherein each of the plurality of coupling devices is a hydraulically operated coupling device, and the torque increasing amount setting portion sets the amount of increase of the input torque of the step-variable transmission such that the amount of increase increases with a decrease of a temperature of a working fluid used to operate the hydraulically operated coupling device.

6. The control apparatus according to claim 1, wherein the vehicle is a hybrid vehicle provided with: an engine functioning as the drive power source; an electrically controlled transmission mechanism having a differential mechanism operatively connected to the engine in a power transmittable manner, and a first motor/generator which is operatively connected to the differential mechanism in a power transmittable manner and an operating state of which is controlled to control a differential state of the differential mechanism; and a second motor/generator which is operatively connected to an output rotary member of the electrically controlled transmission mechanism in a power transmittable manner and which functions as the drive power source, and wherein the shift control portion temporarily increases the input torque of the step-variable transmission beyond the required value thereof, by temporarily increasing an output torque of the second motor/generator beyond a required value thereof.

* * * * *